(12) United States Patent
Krein et al.

(10) Patent No.: US 8,751,342 B2
(45) Date of Patent: Jun. 10, 2014

(54) IDENTIFYING POTENTIAL CUSTOMERS USING PAYMENT INFORMATION

(75) Inventors: Mark Krein, Charlotte, NC (US);
Debashis Ghosh, Charlotte, NC (US);
Thayer Allison, Charlotte, NC (US);
Kurt Newman, Matthews, NC (US);
Yanghong Shao, Charlotte, NC (US);
Sudeshna Banerjee, Waxhaw, NC (US);
David Joa, Irvine, CA (US)

(73) Assignee: Bank of America Corporation, Charlotte, NC (US)

( * ) Notice: Subject to any disclaimer, the term of this patent is extended or adjusted under 35 U.S.C. 154(b) by 1091 days.

(21) Appl. No.: 12/652,554

(22) Filed: Jan. 5, 2010

(65) Prior Publication Data

US 2011/0166977 A1    Jul. 7, 2011

(51) Int. Cl.
*G06Q 40/00* (2012.01)
(52) U.S. Cl.
USPC .............................................. 705/35; 705/39
(58) Field of Classification Search
USPC ......................................... 705/35, 39, 40, 42
See application file for complete search history.

(56) References Cited

U.S. PATENT DOCUMENTS 8,190,520 B1 *   5/2012   Hyland ........................... 705/39

* cited by examiner

*Primary Examiner* — Ojo Oyebisi
(74) *Attorney, Agent, or Firm* — Banner & Witcoff, Ltd.; Michael A. Springs

(57) ABSTRACT

Aspects of this disclosure relate to a computer configured to identify potential customers which may include a processor and memory storing computer executable instructions that, when executed, cause the computer to perform a method for identifying potential customers for a first bank, by electronically receiving data regarding the first bank, electronically receiving data regarding a second bank. Further, based on the electronically received data the method may further include identifying locations of the first bank, identifying locations of the second bank, comparing the locations of the first bank with the locations of the second bank, determining locations of the second bank that are within a predetermined distance of at least one location of the first bank, determining an amount of funds in a set of deposit accounts in each location of the second bank, and determining if the amount of funds in each location of the second bank is more than a predetermined amount.

11 Claims, 16 Drawing Sheets

IDENTIFYING POTENTIAL CUSTOMERS USING PAYMENT INFORMATION

FIELD OF DISCLOSURE

Aspects of the present disclosure relate generally to marketing. Particular aspects of the present disclosure relate to identifying potential customers to which to market goods or services.

BACKGROUND

A common objective of many businesses is to increase its customer base (e.g., the amount of customers to which the business provides goods or services). In particular circumstances, increasing the customer base may require the business to identify potential customers to which to market the business's goods or services. While it is noted that a business may attempt to identify potential customers by merely contacting persons or other organizations that have no pre-existing relationship with the business (e.g., "cold calling"), such methods may not achieve much (or any) increase in a customer base. Therefore, it would be advantageous to employ a more efficient way of identifying potential customers to which to market the business's goods or services.

SUMMARY

Therefore, aspects of this disclosure relate to a computer configured to identify potential customers which may include a processor and memory storing computer executable instructions that, when executed, cause the computer to perform a method for identifying potential customers for a first bank, by electronically receiving data regarding the first bank, electronically receiving data regarding a second bank. Further, based on the electronically received data the method may further include identifying locations of the first bank, identifying locations of the second bank, comparing the locations of the first bank with the locations of the second bank, determining locations of the second bank that are within a predetermined distance of at least one location of the first bank, determining an amount of funds in a set of deposit accounts in each location of the second bank, determining if the amount of funds in each location of the second bank is more than a predetermined amount and identifying financial accounts of the first bank that have been paid using a deposit account of the second bank that is in a location within the predetermined distance of at least one location of the first bank and the amount of funds in the set of deposit accounts at the location of the second bank is more than the predetermined amount. Further, the method may further include electronically receiving data for customers associated with the identified financial accounts and compiling a list of customers associated with the identified financial accounts.

Further aspects of the disclosure may related to a computer assisted method for identifying potential customers for a first bank which may include electronically receiving data relating to addresses of branches of the first bank, electronically receiving data relating to a second bank, including the address of each branch of the second bank and the amount of funds in the deposit accounts in each branch of the second bank and electronically receiving data relating to customers of the first bank, including, whether a customer has paid a financial account that the customer has with the first bank by using a routing number from the second bank and, also, the routing number of the second bank the customer used to pay the financial account the customer has with the first bank. Further, the computer assisted method may include using a computer to compile a list of potential customers to which to market goods and services by making a series of determinations about the electronically received data. The determinations may include: determining if a branch of the second bank has an address within a predetermined distance of an address of a branch of the first bank; determining if the deposit accounts in the branch of the second bank is more than a predetermined amount; and determining a bank routing number for the branch of the second bank when the address of the branch of second bank is within the predetermined distance of an address of a branch of the first bank and the set of the deposit accounts in the branch of the second bank is more than the predetermined amount. The computer assisted method may further include identifying customers who have made a payment to a financial account with the first bank using a bank routing number associated with a branch of the second bank that is within the predetermined distance of an address of a branch of the first bank and the set of the deposit accounts in the branch of the second bank is more than the predetermined amount. The determinations may be stored in the computer.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

DETAILED DESCRIPTION

Figure 1:
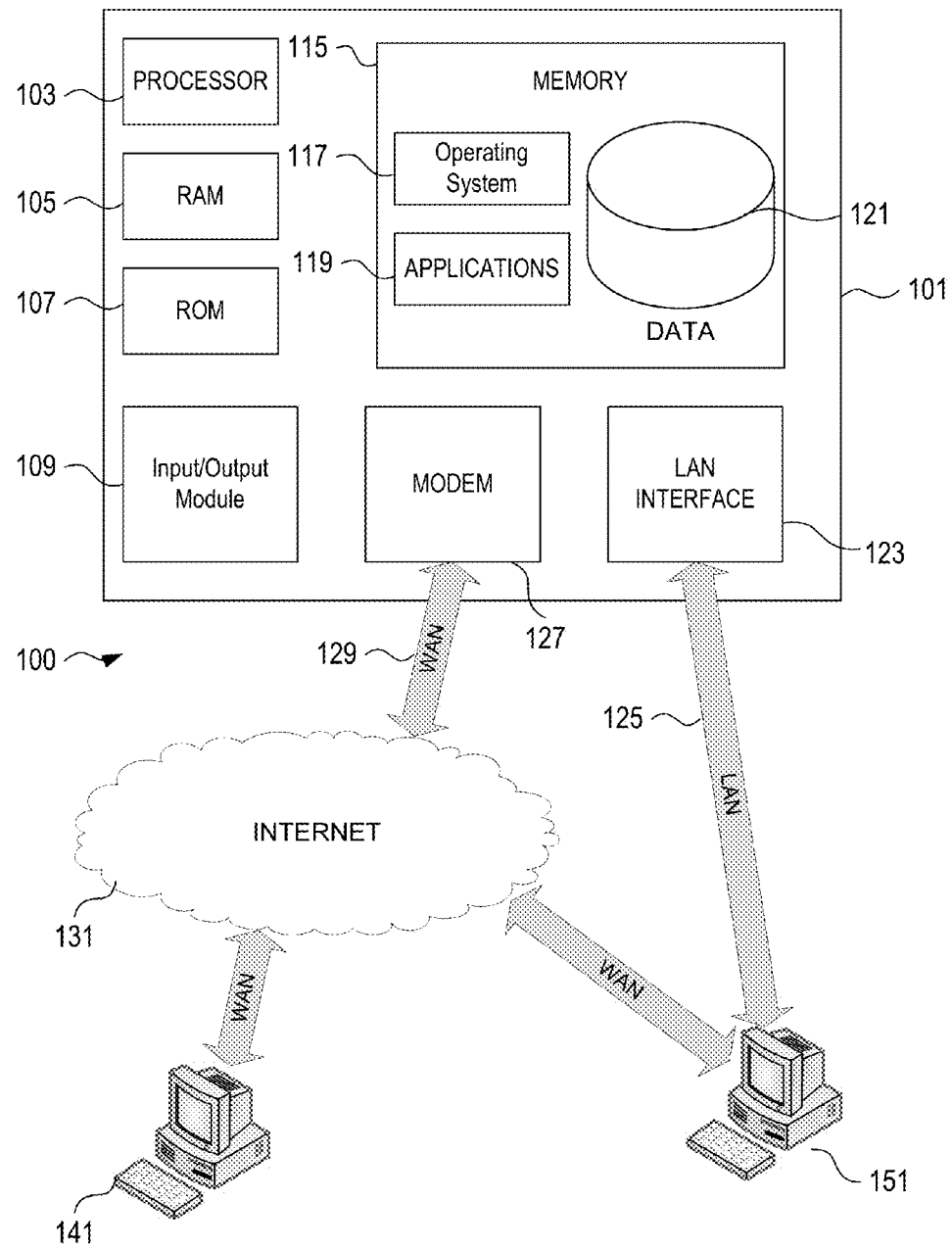
FIG. 1 illustrates a diagram of a general-purpose digital computing environment in which certain aspects of the present disclosure may be implemented.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

As described above, increasing a business's customer base may include identifying potential customers to which to market a business's goods or services. Therefore, aspects of this disclosure are directed to systems and methods for identifying potential customers to which to market the business's goods or services. It is noted that throughout the disclosure, the term bank may be used interchangeably with business, financial institution, organization, and the like. The term bank is not intended to be limiting, but rather merely describe a potential embodiment of the disclosure.

According to some aspects of this disclosure, a business (e.g., a bank) may identify potential customers by leveraging information the bank already has about current customers (e.g., customers with which the bank already has a pre-existing financial relationship). For example, a bank may have a financial relationship with the customer through a: mortgage loan, small business loan, auto loan, credit card account, Home Equity Line of Credit (HELOC), insurance products (e.g., home, car, life, insurance) and the like. Therefore, the bank may already have information about the current customer that has been obtained from the pre-existing financial relationship. For example, according to aspects of this disclosure, the bank may have one or more databases which store such information about the current customers (e.g., customer profile data), and such information may include: a customer's name, address, telephone number, email address, age, credit score, income, debt, place of employment (and its contact information, such as address, telephone numbers,), and the like.

According to some embodiments of this disclosure, a customer who has such a pre-existing financial relationship with the bank (e.g., a loan) may use a financial account (e.g., a deposit account) that is held with a different financial institution (hereinafter "second bank") to make payments on the first financial relationship the customer has with the bank. Such payments may be made via online bill payments, paper check, and the like. These payments may include the routing transit number (i.e., a routing number) of the second bank from which the payment is originating and, also, the customer's individual account number at the second bank. It is noted that a routing number is bank code (e.g., a nine digit code) which is used to identify the particular financial institution from which a payment is drawn. If the customer is paying the bank by online bill payment, then the customer may have to enter the routing number of the second bank (along with the customer's account number) into the bank's online bill pay computer system. Alternatively, if the customer is paying by a paper check, then the face of the paper check includes the second bank's routing number (along with the customer's account number). If other methods of payments from the deposit account at the second bank are used, then the routing number of the second bank and customer's account number would be included. Therefore, regardless of how the routing numbers and account numbers were presented to the bank, the bank would capture and process such routing numbers and account numbers. Further, according to aspects of this disclosure, the bank may have one or more databases which store the routing numbers and account numbers.

According to aspects of this disclosure, the bank may use the above described information (which it already has), including the customer profile data and/or routing numbers of the second bank, to identify potential customers for particular goods or services (e.g., financial products or services) and market such goods or services to them. It is noted in this disclosure, the term potential customer may include current customers with whom the bank already has a pre-existing relationship, because those current customers can be offered additional goods and services.

For example, according to aspects of this disclosure, using the above described information, the bank can determine that such a current customer is a "shared customer" in that the current customer has a financial relationship the bank, but also has at one at least one deposit account with a second bank. Therefore, according to one or more aspect of the disclosure, this information can be leveraged in order to identify potential customers to which the bank can market additional goods and services.

According to aspects of this disclosure, the bank may use the routing numbers of the second bank in order to determine the identity of the second bank which holds the deposit account of the shared customer. Hence, using information the bank already has in its possession, the bank can determine not only how many shared customers the bank has, but, also, the identity of the second banks with which the bank shares those customers. Therefore, according to one or more aspects of the disclosure, this information can be leveraged in order to identify potential customers to which the bank can market additional goods and services.

According to aspects of this disclosure, the bank may use additional information about the shared customer (e.g., in connection with one or both of the above described features) to identify potential customers (or to focus the group of potential customers) to which goods are services are marketed. For example, according to one or more aspects of the disclosure, the bank may leverage customer profile data (e.g., the customer's address, income level, age, and the like) in order to identify potential customers to which the bank can market additional goods and services. Further, according to one or more aspects of the disclosure, this information can be leveraged in order to further focus the marketing.

FIG. 1 illustrates an example of a suitable computing system environment 100 that may be used according to one or more illustrative embodiments of the disclosure. The computing system environment 100 is only one example of a suitable computing environment and is not intended to suggest any limitation as to the scope of use or functionality of the disclosure. Neither should the computing system environment 100 be interpreted as having any dependency nor requirement relating to any one or combination of components illustrated in the exemplary computing system environment 100.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, input/output module 109, and memory 115. Computer 101 typically includes a variety of computer readable media. Computer readable media may be any available media that may be accessed by computer 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 101. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although not shown, RAM 105 may include one or more are applications representing the application data stored in RAM memory 105 while the computer is on and corresponding software applications (e.g., software tasks), are running on the computer 101.

Input/output module 109 may include a microphone, keypad, touch screen, and/or stylus through which a user of computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101's computer executable instructions may be embodied in hardware or firmware (not shown). As described in detail below, the database 121 may provide centralized storage of account information and account holder information for the entire business, allowing interoperability between different elements of the business residing at different physical locations.

Computer 101 may operate in a networked environment supporting connections to one or more remote computers, such as branch terminals 141 and 151. The branch computers 141 and 151 may be personal computers or servers that include many or all of the elements described above relative to the computer 101. The network connections depicted in FIG. 1 include a local area network (LAN) 125 and a wide area network (WAN) 129, but may also include other networks. When used in a LAN networking environment, computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the disclosure may include computer executable instructions for invoking user functionality related to communication, such as email, short message service (SMS), and voice input and speech recognition applications.

Terminals 141 or 151 may also be mobile terminals including various other components, such as a battery, speaker, and antennas (not shown). Input/output module 109 may include a user interface including such physical components as a voice interface, one or more arrow keys, joystick, data glove, mouse, roller ball, touch screen, or the like.

Figure 2:
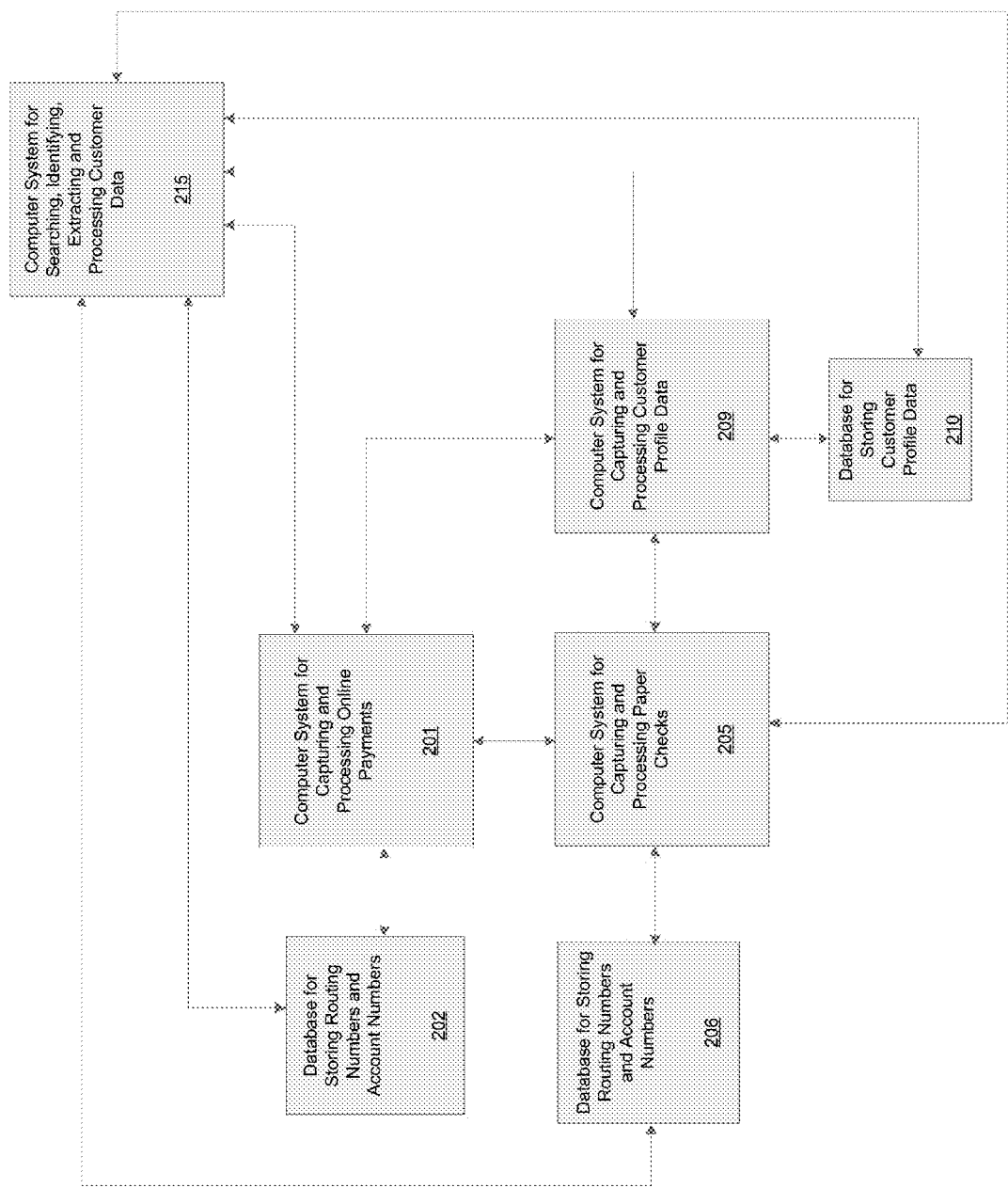
FIG. 2 illustrates a block diagram of a computing environment in which certain aspects of the present disclosure may be implemented.

According to aspects of this disclosure, a bank may have one or more computer systems that are used for capturing and processing data related to above described payments that originate from a second bank. FIG. 2 illustrates a block diagram of a computing environment in which certain aspects of the present disclosure may be implemented. As seen in FIG. 2, a bank may have one or more computer systems 201 that are used for capturing and processing data used for online bill payments. Additionally, as seen in FIG. 2, a bank may have one or more computer systems 205 that are used for capturing and processing data used for payments made by paper check. Further, the bank may have one or more computer systems for capturing and processing data used in other methods of payment (not shown).

In regard to the one or more computer systems 201 used for capturing and processing data for online bill payments, such computer systems 201 may be configured to allow current customers to input routing numbers and account numbers for the deposit accounts at second banks from which the payments are made. Further, the computer systems 201 may be configured to transmit and receive funds using the routing numbers and account numbers inputted by the current customers. Additionally, the computer systems 201 used for capturing and processing data for online bill payments may include one or more databases 202 for storing the routing numbers and account numbers for the deposit accounts of second banks from which the payments are made. For example, if the customer submits a one-time payment from the deposit account with the second bank or schedules a recurring automatic payment from the deposit account with the second bank, the routing number and account number of deposit account with the second bank may be captured and stored in a database 202 associated with the one or more computer systems 201 used for capturing and processing data for online bill payments. Also, the computer systems 201 used for capturing and processing data for online bill payments may be configured to transmit the routing numbers and account numbers (e.g., to other computer systems or databases within the bank).

In regard to the one or more computer systems 205 used for capturing and processing data from paper checks, such computer systems 205 may be configured to retrieve from the paper checks, the routing numbers and account numbers of the deposit accounts of second banks from which the payments are made. For example, the computer systems 205 may include one or more scanning devices which scan the paper checks and create electronic images of the paper checks that the computer systems 205 will store in one or more databases. Further, the computer systems 205 may be configured to extract and read the routing numbers and account numbers from the paper check or the electronic image of the paper check (e.g., Optical Character Recognition (OCR) software or the like) and, also, be configured to transmit and receive funds using the routing numbers and account numbers obtained from the paper checks. Additionally, the computer systems 205 used for capturing and processing data for paper checks may include one or more databases 206 for storing the routing numbers and account numbers for deposit accounts from second banks (it is noted that according to some aspects of the disclosure, the databases 206 may be the same databases as the one or more databases 202 for storing account and routing numbers that were described above). For example, once the paper check has been scanned and the routing number and account number from the paper check has been extracted and read, the routing number and account number of deposit account with the second bank may be stored in a database 206 associated with the computer systems 205 used for capturing and processing data for paper check. Also, the computer systems 205 used for capturing and processing data for paper check may be configured to transmit the routing numbers and account numbers (e.g., to other computer systems or databases within the bank).

According to aspects of this disclosure, a bank may have one or more computer systems 209 that are used for capturing and processing data related to the above described current customers' profiles. For example, a bank may have one or more computer systems 209 that are used for capturing and processing data about current customers and their financial relationships with the bank, such as: customer name, address, telephone number, email address, age, credit score, income, debt, place of employment (and its contact information, such as address, telephone numbers, and the like), the type of financial relationship/account (e.g., a loan, insurance, and like), term of the relationship (e.g., term of a loan, the time current customer has been with the bank, and the like), particular relevant financial amounts in the relationship (e.g., monthly payments, total debt, interest rate, and the like), if one or more of the payments on the account have been made from a deposit account with a second bank, routing numbers and account numbers (e.g., entered by the customer or transmitted from the databases 202 and 206 wherein the routing numbers and account numbers may have been captured and stored), whether automatic payments are set up to receive funds from a second bank, and the like. The computer systems 209 used for capturing and processing customer profile data, may be configured to allow customers to input such customer profile data (e.g., via a web based system) or allow bank employees to enter such customer profile data. Further, the computer systems 209 may include one or more databases 210 for storing the customer profile data. For example, if the customer or bank employee enters such customer profile data, then the customer profile data may be stored in a database 210 associated with the computer systems 209 used for capturing and processing customer profile data. Also, the computer systems 209 used for capturing and processing current customer profile may be configured to transmit the customer profile data (e.g., to other computer systems or databases within the bank).

According to one or more aspects of the disclosure, a bank may have one or more computer systems 215 that are configured to search for, identify, extract and process data from the above described computer systems 201, 205, 209 and their respective databases 202, 206, 210. For example, the one or more computer systems 215 may search for, identify, extract and process data from the databases which store routing numbers and the databases which store customer profile data. For example, according to one or more aspects of this disclosure, the computer systems 215 may be configured to search customer profiles for any current customer accounts wherein a payment on the account has been made from a deposit account at a second bank. Further, once those accounts are identified, the computer systems 215 may extract data from the customer profile data and compile the data in a format specified by the user (e.g., a list or spreadsheet). Additionally, the extracted data may be processed further as desired by the user (e.g., address information that is extracted may be formatted to be put into address labels, and the like).

It is noted, that according to aspects of this disclosure, the computer systems 215 configured to search for, identify, extract and process data may be configured so the user is able to specify which particular data the user wants to search for, identify, extract and process. For example, the user may specify that the routing numbers of a second bank from which payments are made and the customer's residential address are to be searched for, identified, extracted and processed. As another example, the user may specify that the routing numbers of a second bank from which payments are made and the customer's income level are to be searched for, identified, extracted and processed.

Therefore, it is understood, that according to one or more aspects of this disclosure, the bank may employ the computer systems 215 to search for, identify, extract and process data the bank already has (e.g., data from the one or more databases containing customer profile information and/or routing number of a second bank from which payments are made) in order to leverage such information to identify potential customers to which the bank can market additional goods and services.

Aspects of this disclosure relate to various systems and methods for identifying potential customers to which to market goods and/or services. For example, according to aspects of this disclosure, potential customers may be identified by determining if the customer is a shared customer (i.e., current customers who have a financial relationship the bank, but also has at one at least one deposit account with a second bank).

According to one or more aspects of this disclosure, the bank may use the routing numbers obtained and stored from the above described systems and methods in order to determine which of the bank's current customers are shared customers. For example, the bank may use computers 215 that are configured to search for, indentify, extract, and process data from the one or more databases containing routing numbers and customer profile information 202, 206, 210 to search the customer profile data for accounts that have used a routing number from a second bank to make a payment on the account with the customer has with bank (e.g., mortgage loans, small business loans, credit card accounts, car loans, HELOCs, insurance products). It is noted that these accounts which include a routing number from a second bank from which a payment has been made would thereby identify current customer of the bank who are shared customers.

Further, according to aspects of this disclosure, once such shared customer accounts have been identified, the computers 215 may be configured to search for, identify and extract customer profile information for the shared customers from the customer profile data associated with those shared customer accounts. Such customer profile data may include a customer's name and also the customer's contact information including their residential address information. Additionally, according to aspects of this disclosure, the computers 215 may be configured to process the extracted data and compile a list of those shared customer accounts along with the respective contact information for the shared customers. According to one or more aspects of this disclosure, the list of shared customer accounts and the respective contact information for the shared customers may be stored for further use.

According to aspects of this disclosure, this above described compiled list of shared customers is beneficial because it identifies potential customers to which the bank can market goods and services. Further, the above described compiled list is advantageous because it identifies potential customers who already have a pre-existing relationship with the bank and, therefore, are more likely to be interested in the goods or services marketed by the bank. Hence, the bank may use the compiled list to market products (e.g., a deposit account with the bank) to the potential customers identified on the compiled list. Further, the bank may use the contact information (e.g., the customer's residential address) to market such goods and/or services. For example, according to aspects of the disclosure, the bank may send marketing literature, such as pamphlets, brochures, and the like regarding products, such as a deposit account with the bank, to the residential addresses of the shared customers. It is noted, that while the above described system and method mentions using residential addresses as a method of contacting potential customers, other contact information, such as the shared customers' telephone numbers, email address, and the like could have been used as well. In such cases, the representatives of the bank may call the customers directly or email promotional material, such as electronic copies of marketing literature, such as pamphlets, brochures, and the like.

Figure 3:
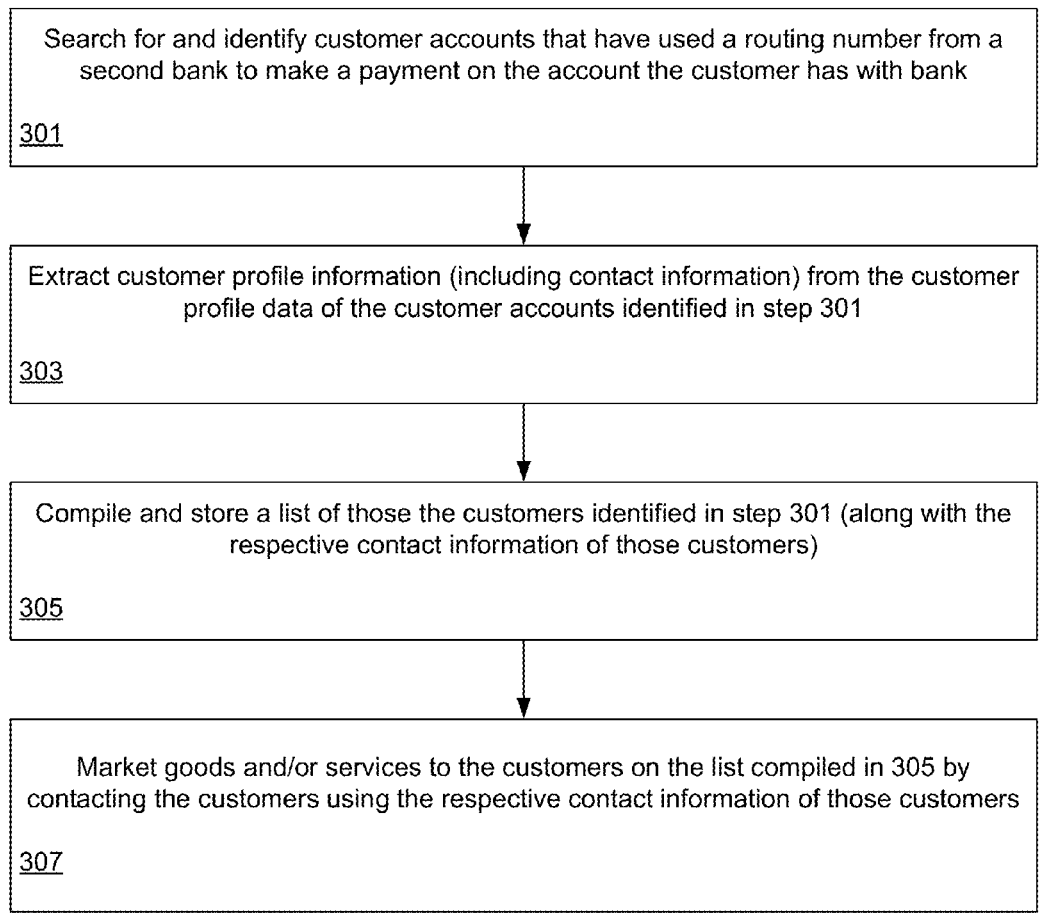
FIG. 3 illustrates a flow chart which describes an illustrative process for identifying potential customers according to one aspect of the disclosure.

FIG. 3 illustrates a flow chart which describes an illustrative process for implementing the above described features for identifying potential customers. As seen in FIG. 3, in step 301, the bank may search for and identify customer accounts that have used a routing number from a second bank to make a payment on the account the customer has with the bank (e.g., the bank may use computers 215 to search the customer profile database 210). Further, in step 303, the bank may extract (e.g., via one or more computers 215) the customer's profile information (including contact information) from the customer profile data of the customer accounts identified in step 301. Additionally, in step 305, the bank may process (e.g., via one or more computers 215) the extracted data and compile and store a list of those shared customers along with the respective contact information of the shared customers. Finally, in step 307, the bank may market goods and/or services (e.g., a deposit account with the bank) to the shared customers associated with the subset of customer accounts identified in step 305 by contacting the customers using the respective contact information of those customers extracted in step 303.

In addition to the above described system and method for identifying potential customers to which to market goods and/or services, aspects of this disclosure relate to various other systems and methods and for identifying potential customers to which to market goods and/or services. For example, according to aspects of this disclosure, potential customers may be identified by determining if the customer is a shared customer and, further, determining if the customer's residential address or the address of the customer's place of employment is within a predetermined distance of a branch of the bank.

According to aspects of this disclosure, whether a customer is a shared customer may be identified in the above described manner (e.g., using computers 215 that identify accounts that have used a routing number from a second bank to make a payment on the account the customer has with the bank by searching customer profile data in selected databases). However, once such a subset of shared customer accounts have been identified, the computers 215 may be configured to search the subset of identified shared customer accounts for the shared customers' residential address information and/or the customer's address information for the customer's place of employment.

Further, according to aspects of this disclosure, the computers 215 may be configured to extract and process the customer profiled data and compile a list of those shared customer accounts along with the respective residential addresses and/or addresses for the customer's place of employment. According to one or more aspects of this disclosure, the list of shared customers and their respective addresses may be stored for further use.

According to aspects of this disclosure, the bank may compile a list of addresses of all the branches, banking centers, and the like within the bank. It is noted that the term branches will be used throughout this disclosure to refer to geographic locations of a bank (e.g., branches, banking centers, and the like), but is used merely for simplicity and is intended to be representative.

According to aspects of this disclosure, the customer's address information (either residential, place of employment, or both) may be compared with a compilation of the addresses of the all the branches of the bank. According to aspects of this disclosure, if the customer's address information (either residential, place of employment, or both) is within a predetermined distance (e.g., one to three miles) of the branches of the bank, then the shared customer may be identified as a potential customers to which to market goods and/or services.

The above described comparison of shared customers' address information (either residential, place of employment, or both) with the locations of the branches of the bank can be done in various ways. For example, one such method may include using a computer program which charts the locations of the branches (e.g., in a format wherein the locations of the branches are positioned on a map of a geographic area (e.g., a map of a country)) and then incorporates the different customers' address information by overlaying the information over the locations of the branches of the bank. The computer program may then automatically determine which customers have an address with the predetermined distance specified by the user. For example, a commercially available program could be used for such a comparison of the geographic locations of the customers' addresses (either residential, place of employment, or both) and the branches of the bank. Additionally, it is noted that the comparison may be done in other ways as well (e.g., manually or via a computer, wherein the addresses are compared via a spreadsheet or another format).

Further, according to aspects of this disclosure, once such comparison has been made and the shared customers who have an address within a predetermined distance of at least one branch of the bank have been identified, the computers 215 may be configured to process the data and compile a list of the subset of those shared customer whose residential address or address of their respective places of employment are within the predetermined distance of at least one branch of the bank. The list may include the respective contact information of the shared customers. According to one or more aspects of this disclosure, the list of shared customers whose residential address and/or address of their respective places of employment are within the predetermined distance of at least one branch of the bank (and their respective contact information) may be stored for further use.

According to aspects of this disclosure, this above compiled list of shared customers whose residential address and/or address of their respective places of employment are within the predetermined distance of at least one branch of the bank identifies potential customers to which the bank can market goods and services. Further, it is noted that the above described compiled list is advantageous because it identifies shared customers who live or work relatively close (i.e., within the predetermined distance) to at least one of the branches of the bank and, therefore, because of the geographical proximity between the branches of the bank and the locations at which the customer spends a large amount of time (i.e., home or work), the customer is more likely to be interested in particular goods and/or services (e.g., a deposit account) marketed by that the bank. Hence, the bank may use the compiled list to market products, such as a deposit account with the bank to the potential customers identified on the list. Further, the bank may use the shared customers' contact information (e.g., residential address, phone numbers, email address, and the like) to market such products as has been described above.

Figure 4:
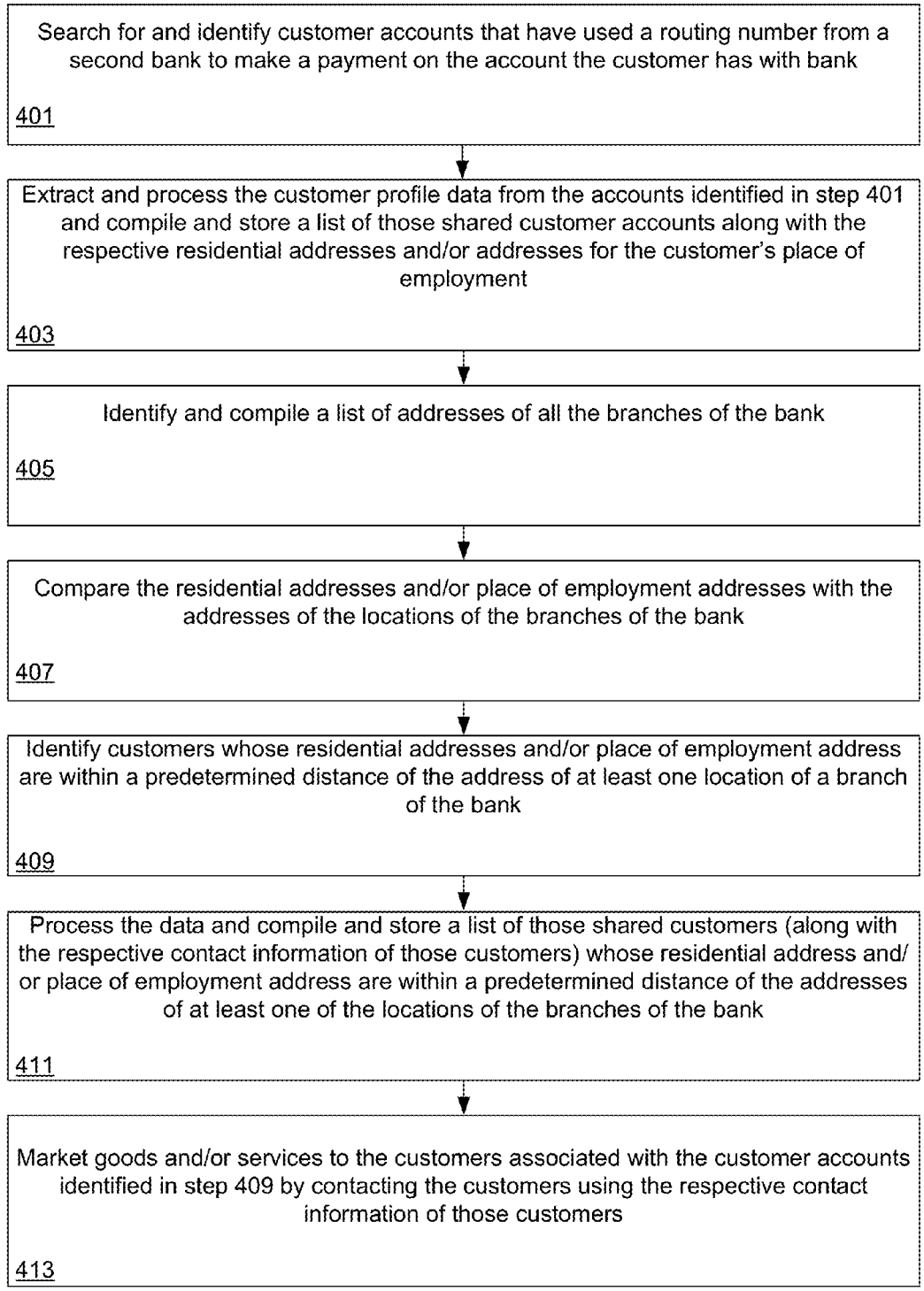
FIG. 4 illustrates a flow chart which describes an illustrative process for identifying potential customers according to one aspect of the disclosure.

FIG. 4 illustrates a flow chart which describes an illustrative process for implementing the above described features for identifying potential customers. As seen in FIG. 4, in step 401, the bank may search for and identify customer accounts that have used a routing number from a second bank to make a payment on the account the customer has with the bank (e.g., the bank may use computers 215 to search customer profile databases 210). Further, in step 403, the bank may (e.g., via one or more computers 215) extract and process the customer profile data from the accounts identified in step 401 and compile and store a list of those shared customers along with their respective residential addresses and/or addresses for the customer's place of employment. In step 405, the bank may identify and compile a list of the addresses of all the branches of the bank. Additionally, in step 407, the bank may (e.g., via one or more computers 215) compare the residential addresses and/or place of employment addresses from the customer profile data of the customer accounts identified in step 403 with the addresses of the locations of the branches of the bank. In step 409, the bank (e.g., via one or more computers 215) identify customers whose residential address and/or place of employment address are within a predetermined distance of the address of at least location of a branch of the bank. Additionally, in step 411, the bank may (e.g., via one or more computers 215) process the data and compile and store a list of those shared customer whose residential address and/or place of employment address are within a predetermined distance of the addresses of at least one of the locations of the branches of the bank. The respective contact information of the shared customers may be included in the list. Finally, in step 413, the bank may market goods and/or services (e.g., a deposit account with the bank) to the customers associated with the customer accounts identified in step 409 by contacting the customers using the respective contact information of those customers.

In addition the above described systems and methods for identifying potential customers to which to market goods and/or services, aspects of this disclosure relate to various other systems and methods and for identifying potential customers to which to market goods and/or services. For example, according to aspects of this disclosure, potential customers may be identified by determining if the customer is a shared customer and, further, determining the specific routing number of the second bank which holds the shared customer's deposit account from which payments are made.

According to aspects of this disclosure, whether a customer is a shared customer may be identified in the above described manner (e.g., using computers 215 that identify accounts that have used a routing number from a second bank to make a payment on the account the customer has with the bank by searching customer profile data in selected databases). However, once such shared customer accounts have been identified, the computers 215 may be configured to search the subset of identified shared customer accounts for accounts which include a specific routing number associated with a second bank that holds the shared customer's deposit account from which payments are made. Thereby, the computers 215 may identify any shared customer accounts which make payments from deposit accounts at a particular bank (i.e., any shared customer accounts which contain the particular routing number).

Further, according to aspects of this disclosure, once such shared customer accounts have been indentified, the computers 215 may be configured to search for, identify and extract customer profile information for the shared customers from the customer profile data associated with those shared customer accounts. Such customer profile data may include a customer's name and also the customers respective contact information. Further, according to aspects of this disclosure, the computers 215 may be configured to process such extracted customer profile data and compile a list of those shared customer accounts which make payments from deposit accounts at a particular bank (along with the respective contact information). According to one or more aspects of this disclosure, the list of shared customers and their respective contact information may be stored for further use.

According to aspects of this disclosure, this above compiled list of shared customers having a particular routing number of the second bank which holds the shared customer's deposit account from which payments are made identifies potential customers to which the bank can market goods and services. Further, it is noted that the above described compiled list is advantageous because it identifies shared customers who have a deposit account with a particular bank. Therefore, such a list may be useful, because in particular circumstances such customers are likely to be interested in particular goods or services (e.g., a deposit account) that the bank wishes to market. For example, if a particular second bank is going out of business, being acquired by another bank, closing branches in a particular region of the country, and the like, then customers of that second bank are more likely to want to switch their banking needs to another financial institution. Therefore, if a bank already has a pre-existing financial relationship with the shared customers, it may be more likely to convince the shared customers to switch their banking needs to the bank if the bank markets its services to the shared customers at the time when the shared customers are looking for a new bank due to the second bank's withdrawal.

Hence, the bank may use the above compiled list to market products, such as a deposit account with the bank to the potential customers identified on the list. Further, the bank may use the shared customer's contact information (e.g., residential address, phone numbers, email address, and the like) to market such products.

Figure 5:
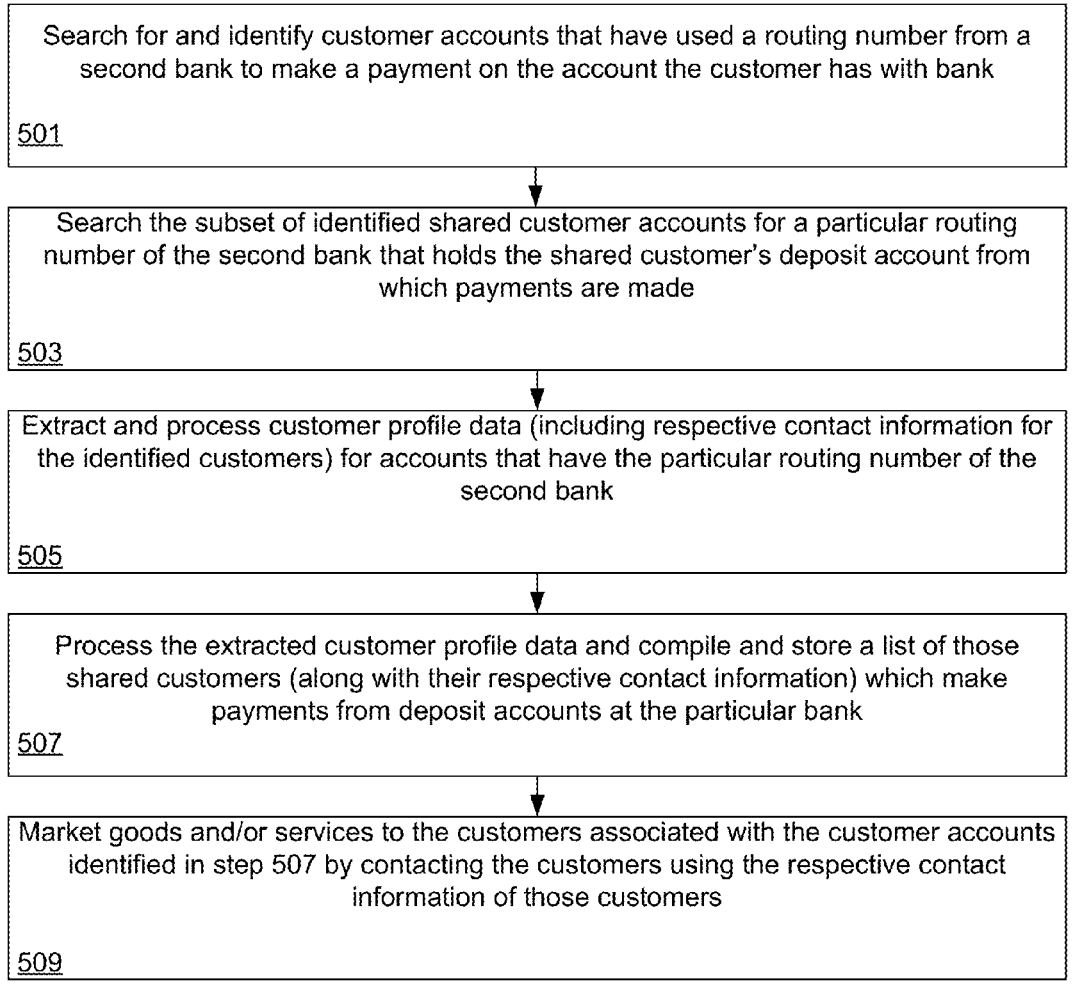
FIG. 5 illustrates a flow chart which describes an illustrative process for identifying potential customers according to one aspect of the disclosure.

FIG. 5 illustrates a flow chart which describes an illustrative process for implementing the above described features for identifying potential customers. As seen in FIG. 5, in step 501 the bank may search for and identify customer accounts that have used a routing number from a second bank to make a payment on the account the customer has with the bank (e.g., the bank may use computers 215 to search customer profile databases 210). Further, in step 503, once such shared customer accounts have been identified, the bank may (e.g., via one or more computers 215) search the subset of identified shared customer accounts for a particular routing number of the second bank that holds the shared customer's deposit account from which payments are made. Further, in step 505, the bank may (e.g., via one or more computers 215) extract and process customer profile data (including respective contact information for the identified customers) for shared accounts having a particular routing number of the second bank that holds deposit account from which payments are made. Further, in step 507, the bank may (e.g., via one or more computers 215) process such extracted customer profile data and compile a list of those shared customers which make payments from deposit accounts at a particular bank (along with the respective contact information). According to one or more aspects of this disclosure, the list of shared customers and their respective contact information may be stored for further use. Finally, in step 509, the bank may market goods and/or services (e.g., a deposit account with the bank) to the customers associated with the customer accounts identified in step 507 by contacting the customers using the respective contact information of those customers.

In addition the above described systems and methods for identifying potential customers to which to market goods and/or services, aspects of this disclosure relate to various other systems and methods and for identifying potential customers to which to market goods and/or services. For example, according to aspects of this disclosure, potential customers may be identified by determining if the customer is a shared customer and, further, determining the specific routing number of the second bank which holds the shared customer's deposit account from which payments are made, and, further, determining if one or more of the second bank's branches are within a predetermined distance of a branch of the bank.

According to aspects of this disclosure, whether a customer is a shared customer may be identified in the above described manner (e.g., using computers 215 that identify accounts that have used a routing number from a second bank to make a payment on the account the customer has with the bank by searching customer profile data in selected databases). However, once such shared customer accounts have been identified, the computers 215 may be configured to search the subset of identified shared customer accounts for accounts which include a specific routing number associated with a second bank that holds the shared customer's deposit account from which payments are made. Thereby, the computers 215 may identify any shared customer accounts which make payments from deposit accounts at that particular bank (i.e., any shared customer accounts which contain the particular routing number).

According to one or more aspects of this disclosure, once the bank determines the identity of the second bank, the bank may determine all of the geographic locations branches of the second bank. Such geographic information may be readily available from various sources such as the second bank's public disclosures, government records, and the like. Further, according to aspects of this embodiment, once the bank has determined the geographic locations of the branches of the second bank, the bank may then compare and analyze the geographic locations of the bank's own branches with the geographic locations of the second bank's branches. This comparison may be done in several ways. For example, the information could be viewed and compared manually or with a computer program. Further, the information may be compiled and put in the form of spreadsheet, chart, geographic map, and the like or combinations thereof.

According to some aspects of this embodiment, the bank may determine if there is any overlap between the geographic locations of their own branches and the branches of the second bank. Overlap may refer to the situation when the first bank has a branch within predetermined distance of a branch of the second bank. For example, in some embodiments of this disclosure, overlap (i.e., an overlapping zone) may be considered to be a branch within three miles of at least one branch of the second bank. However, what distance constitutes an overlap may be variable and can be specifically defined as desired by the bank making the comparison. For example, the bank use other predetermined distances (e.g., 1 mile, 5 miles, same zip code, and the like) in determining overlap.

According to aspects of this disclosure, if shared customers uses a branch of the second bank to make a payment (as determined by the bank routing number of the second bank used in the payment) and that branch of the second bank is within the overlap (e.g., a branch of the second bank that is within 3 miles of a branch of the bank), then the shared customer may be identified as a potential customers to which to market goods and/or services.

The above described comparison of the locations of the branches of the bank and branches of the second bank can be done in various ways. For example, one such method may include using a computer program which charts the locations of the branches of the bank and the locations of the branches of the bank (e.g., in a format wherein the locations of the branches of the bank are positioned on a map of a geographic area (e.g., a map of a country)) and then incorporates the different branches of the second bank by overlaying the locations of the branches of the second bank over the locations of the branches of the bank (e.g., using their addresses). The computer program may then automatically determine which locations of the bank have an address within a predetermined distance (specified by the user) of at least one of the addresses of the branches of the second bank. For example, the commercially available program discussed above is a tool that could be used for such a comparison of the geographic locations of the branches of the two banks Additionally, it is noted that the comparison may be done in other ways as well (e.g., manually or via a computer, wherein the addresses are compared via a spreadsheet or another format).

Further, according to aspects of this disclosure, once such comparison has been made to identify shared customers whose routing number in their payment information indicates that the payment was made from a second bank branch that is within a predetermined distance of at least one branch of the bank, the computers 215 may be configured to process the data and compile a list of the indentified shared customers. The list may include the respective contact information of the shared customers. According to one or more aspects of this disclosure, the list of such shared customers may be stored for further use.

According to aspects of this disclosure, this above described compiled list of shared customers whose profile information includes a particular routing number of a second bank which holds the shared customer's deposit account from which payments are made and such a second bank has a branch within a predetermined distance of at least one branch of the bank identifies potential customers to which the bank can market goods and services. It is noted that the above compiled list is advantageous because it identifies, shared customers who have a deposit account with a particular bank. As discussed above, such information may be useful, because under particular circumstances such customers are likely to be interested in particular goods or services (e.g., a deposit account) that the bank wishes to market. For example, if any of the above discussed situations occur (i.e., a particular second bank is going out of business, being acquired by another bank, closing branches in a particular region of the country, and the like), then customer of that second bank are more likely to want to switch their banking needs to another financial institution. Therefore, if a bank already has a pre-existing financial relationship with the shared customers, it may be more likely to convince the shared customers to switch their banking needs to the bank if the bank markets its services to the shared customers at a time when the shared customers are looking for a new bank due to the second bank's withdrawal. For example, according to one aspect of this disclosure, the marketing may be scheduled to occur shortly after the shared customers are informed of the second bank's withdrawal from the area (e.g., when the second bank closes a branch). For example, at that time, the bank can market to the shared customers it has a branch in the same general location of the branch that the second bank will be closing (i.e. that the shared customers can still have a local bank if they open a new deposit account with their bank). Therefore, the bank can use the timing of the closing of the second bank's branch to the bank's advantage if it markets to the shared customers at a time when the bank knows the customers might be searching for a new local or convenient bank. Further, due to the relatively close proximity (i.e., the determined overlap) between the branches of the bank and the second bank, it is less likely that the shared customer would be reluctant to open a deposit account with the bank based purely on inconvenience of the geographic location of the bank's branch.

Hence, the above described comparison and analysis of the geographic locations of the branches of the bank with the geographic locations of the branches of the second bank may be advantageous in identifying potential customers to which to market the bank's goods and services, because the bank may consider any such customer to be potential customers to whom the bank can market goods and services. Therefore, the bank may use the list to market products, such as a deposit account with the bank, to the potential customers identified on the list. Further, the bank may use the shared customer's contact information (e.g., residential address, phone numbers, email address, and the like) to market such products.

Figure 6A:
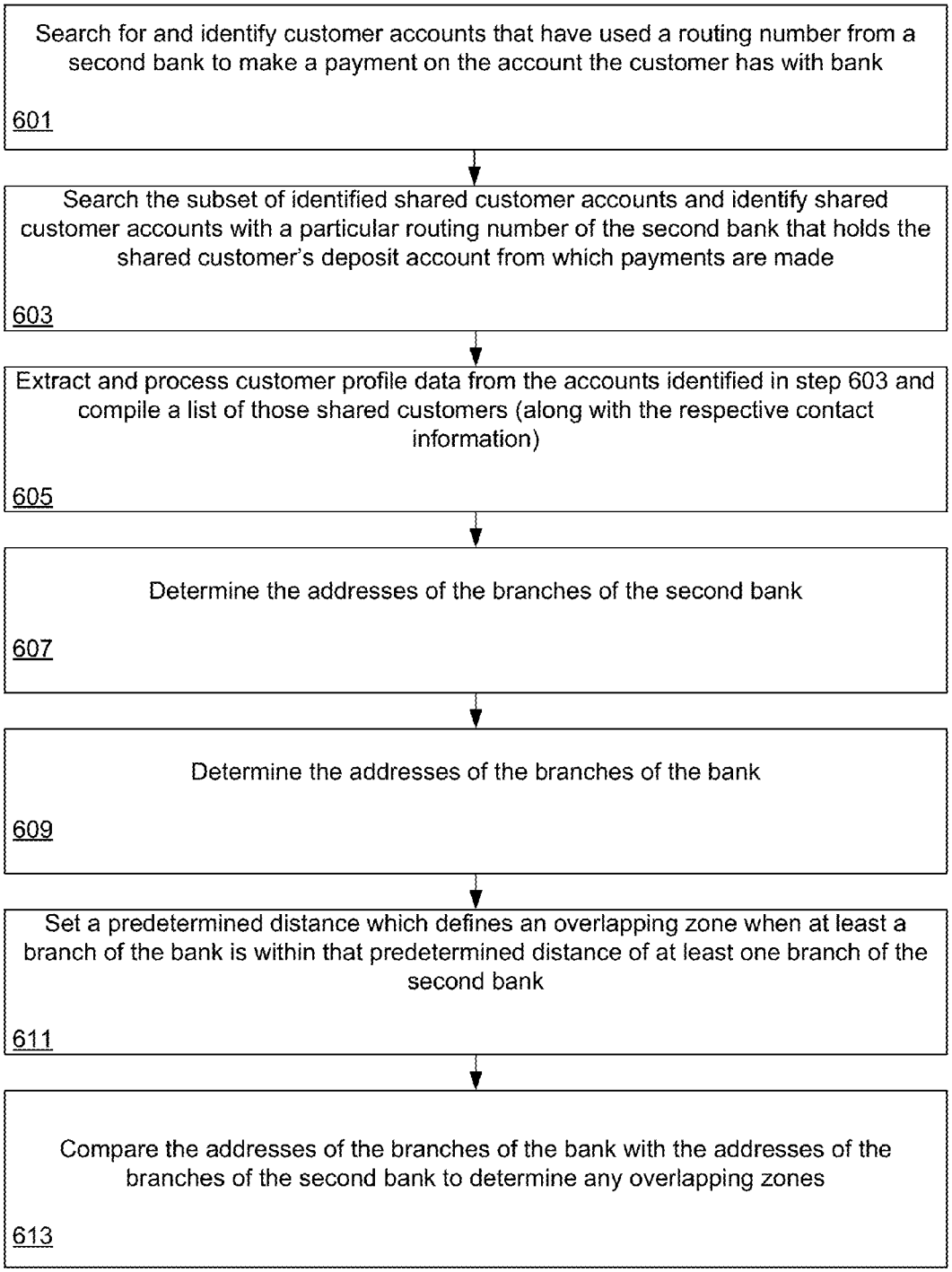
FIGS. 6A and 6B illustrate a flow chart which describes an illustrative process for identifying potential customers according to one aspect of the disclosure.
Figure 6B:
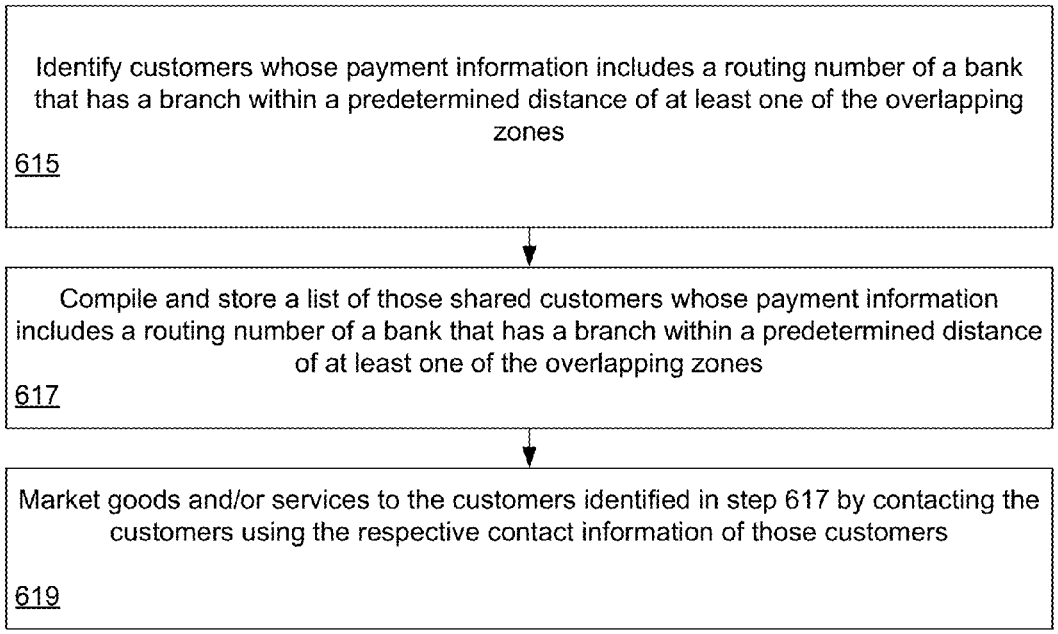

FIGS. 6A and 6B illustrate a flow chart which describes an illustrative process for implementing the above described features for identifying potential customers. As seen in FIGS. 6A and 6B, in step 601 the bank may search for and identify customer accounts that have used a routing number from a second bank to make a payment on the account the customer has with the bank (e.g., the bank may use computers 215 to search customer profiles databases 210). Further, in step 603, once such shared customer accounts have been identified, the bank may (e.g., via one or more computers 215) search the subset of identified shared customer accounts and identify shared customer accounts with a particular routing number of the second bank that holds the shared customer's deposit account from which payments are made. Further, in step 605, the bank may (e.g., via one or more computers 215) extract and process customer profile data from the accounts identified in step 603 and compile a list of those shared customers (along with the respective contact information). Further, in step 607, the bank may (e.g., via one or more computers 215) determine the addresses of the branches of the second bank. Further, in step 609, the bank may (e.g., via one or more computers 215) determine the addresses of the branches of the bank. Further, in step 611, the bank may (e.g., via one or more computers 215) set a predetermined distance which defines an overlapping zone when at least a branch of the bank is within that predetermined distance of at least one branch of the second bank. Further, in step 613, the bank may (e.g., via one or more computers 215) compare the addresses of the branches of the bank with the addresses of the branches of the second bank to determine any overlapping zones. In step 615, the bank (e.g., via one or more computers 215) may identify customers whose payment information includes a routing number of a bank that has a branch within a predetermined distance of at least one of the overlapping zones. Additionally, in step 617, the bank may (e.g., via one or more computers 215) process the data and compile and store a list of those shared customer whose payment information includes a routing number of a bank that has a branch within a predetermined distance of at least one of the overlapping zones. The respective contact information of the shared customers may be included in the list. Finally, in step 619, the bank may market goods and/or services (e.g., a deposit account with the bank) to the customers associated with the customer accounts identified in step 617 by contacting the customers using the respective contact information of those customers.

In addition the above described systems and methods for identifying potential customers to which to market goods and/or services, aspects of this disclosure relate to various other systems and methods and for identifying potential customers to which to market goods and/or services. For example, according to aspects of this disclosure, potential customers may be identified by determining if the customer is a shared customer and, further, determining the specific routing number of the second bank which holds the shared customer's deposit account from which payments are made, and, further, determining if one or more of the second bank's branches are within a predetermined distance of a branch of the bank and, further, determining if the customer's residential address or the address of the customer's place of employment within a predetermined distance of the either of the second bank's branch or the bank's branch.

According to aspects of this disclosure, whether a customer is a shared customer may be identified in the above described manner (e.g., using computers 215 that identify accounts that have used a routing number from a second bank to make a payment on the account the customer has with the bank by searching customer profile data in selected databases). However, once such shared customer accounts have been identified, the computers 215 may be configured to search the subset of identified shared customer accounts for accounts which include a specific routing number associated with a second bank that holds the shared customer's deposit account from which payments are made. Thereby, the computers 215 may identify any shared customer accounts which make payments from deposit accounts at that particular bank (i.e., any shared customer accounts which contain the particular routing number).

Further, according to aspects of this disclosure, once such a subset of shared customer accounts with a particular routing number of a particular second bank have been identified, the computers 215 may be configured to search that subset of shared customer accounts for the shared customers' residential address information and/or the customer's address information for the customer's place of employment.

Further, according to aspects of this disclosure, the computers 215 may be configured to process the data and compile a list of those shared customer accounts along with the respective residential addresses and/or addresses for the customer's place of employment. According to one or more aspects of this disclosure, the list of shared customers and their respective addresses may be stored for further use.

According to one or more aspects of this disclosure, once the bank determines the identity of the second bank, the bank may determine all of the geographic locations branches of the second bank. Such geographic information may be readily available from various sources such as the second bank's public disclosures, government records, and the like. Further, according to aspects of this embodiment, once the bank has determined the geographic locations of the branches of the second bank, the bank may then compare and analyze the geographic locations of the bank's own branches with the geographic locations of the second bank's branches. This comparison may be done in several ways. For example, the information could be viewed and compared manually or with a computer program. Further, the information may be compiled and put in the form of spreadsheet, chart, geographic map, and the like or combinations thereof.

According to some aspects of this embodiment, the bank may determine if there is any overlap between the geographic locations of their own branches and the branches of the second bank. Overlap may refer to the situation when the first bank has a branch within predetermined distance of a branch of the second bank. For example, in some embodiments of this disclosure, overlap (i.e., an overlapping zone) may be considered to be a branch within three miles of at least one branch of the second bank. However, what distance constitutes an overlap may be variable and can be specifically defined as desired by the bank making the comparison. For example, the bank use other predetermined distances (e.g., 1 mile, 5 miles, same zip code, and the like) in determining overlap.

According to aspects of this disclosure, the customer's address information (either residential, place of employment, or both) may be compared with the compilation of the addresses of the all the branches of the bank and all the branches of the second bank. According to aspects of this disclosure, if the customer's address (either residential, place of employment, or both) is within a predetermined distance (e.g., two miles) of at least one of the overlapping zones of the branches of the banks, then the shared customer may be identified as a potential customers to which to market goods and/or services.

The above described comparison of shared customers' address information (either residential, place of employment, or both) with the locations of the branches of the bank and branches of the second bank can be done in various ways. For example, one such method may include using a computer program which charts the locations of the branches of the bank and the locations of the branches of the bank and the second bank (e.g., in a format wherein the locations of the branches of the banks are positioned on a map of a geographic area (e.g., a map of a country)) and then incorporates the different customers' address information by overlaying the addresses over the locations of the branches of the bank. The computer program may then automatically determine which customers have an address within a predetermined distance of at least one of the overlapping zones (or within the predetermined distance of at least one of the branches of one of the banks) specified by the user. For example, the commercially available program discussed above is a tool that could be used for such a comparison of the geographic locations of the customers' addresses (either residential, place of employment, or both) and the branches of the two banks Additionally, it is noted that the comparison may be done in other ways as well (e.g., manually or via a computer, wherein the addresses are compared via a spreadsheet or another format).

Further, according to aspects of this disclosure, once such comparison has been made and the shared customers whose addresses (either residential, place of employment, or both) are within a predetermined distance of at least one overlapping zone between at least one branch of the bank and at least one branch of the second bank have been identified, the computers 215 may be configured to process the data and compile a list of the indentified shared customers whose residential address and/or address of their respective places of employment are within the predetermined distance of the overlapping zone between at least one branch of the bank and at least one branch of the second bank. The list may include the respective contact information of the shared customers. According to one or more aspects of this disclosure, the list of shared customers whose residential address and/or address of their place of employment are within the predetermined distance of an overlapping zone between at least one branch of the bank and at least one branch of the second bank and the shared customers' respective contact information may be stored for further use.

According to aspects of this disclosure, this above compiled list of shared customers whose profile information includes a particular routing number of a second bank which holds the shared customer's deposit account from which payments are made and whose addresses (either residential, place of employment, or both) are within a predetermined distance of at least one overlapping zone between at least one branch of the bank and at least one branch of the second bank identifies potential customers to which the bank can market goods and services. It is noted that the above compiled list is advantageous because it indentifies shared customers who have a deposit account with a particular bank. As discussed above, such information may be useful, because under particular circumstances such customers are likely to be interested in particular goods or services (e.g., a deposit account) that the bank wishes to market. Further, indentifying a subset of those shared customers whose addresses (either residential, place of employment, or both) are within a predetermined distance of at least one overlapping zone between at least one branch of the bank and at least one branch of the second bank (i.e., shared customer who live or work within a predetermined distance of an overlapping zone) may also be particularly useful.

Hence, the above described comparison and analysis of the geographic locations of the addresses of the shared customers who have deposit accounts at a specific second bank (either residential, place of employment, or both) with the geographic locations of the addresses of the branches of the bank and branches of second banks may be advantageous in identifying potential customers to which to market the bank's goods and services, because the bank may consider any such customer to be potential customers to whom the bank can market goods and services.

Therefore, the bank may use the list to market products, such as a deposit account with the bank, to the potential customers identified on the list. Further, the bank may use the shared customer's contact information (e.g., residential address, phone numbers, email address, and the like) to market such products.

Figure 7A:
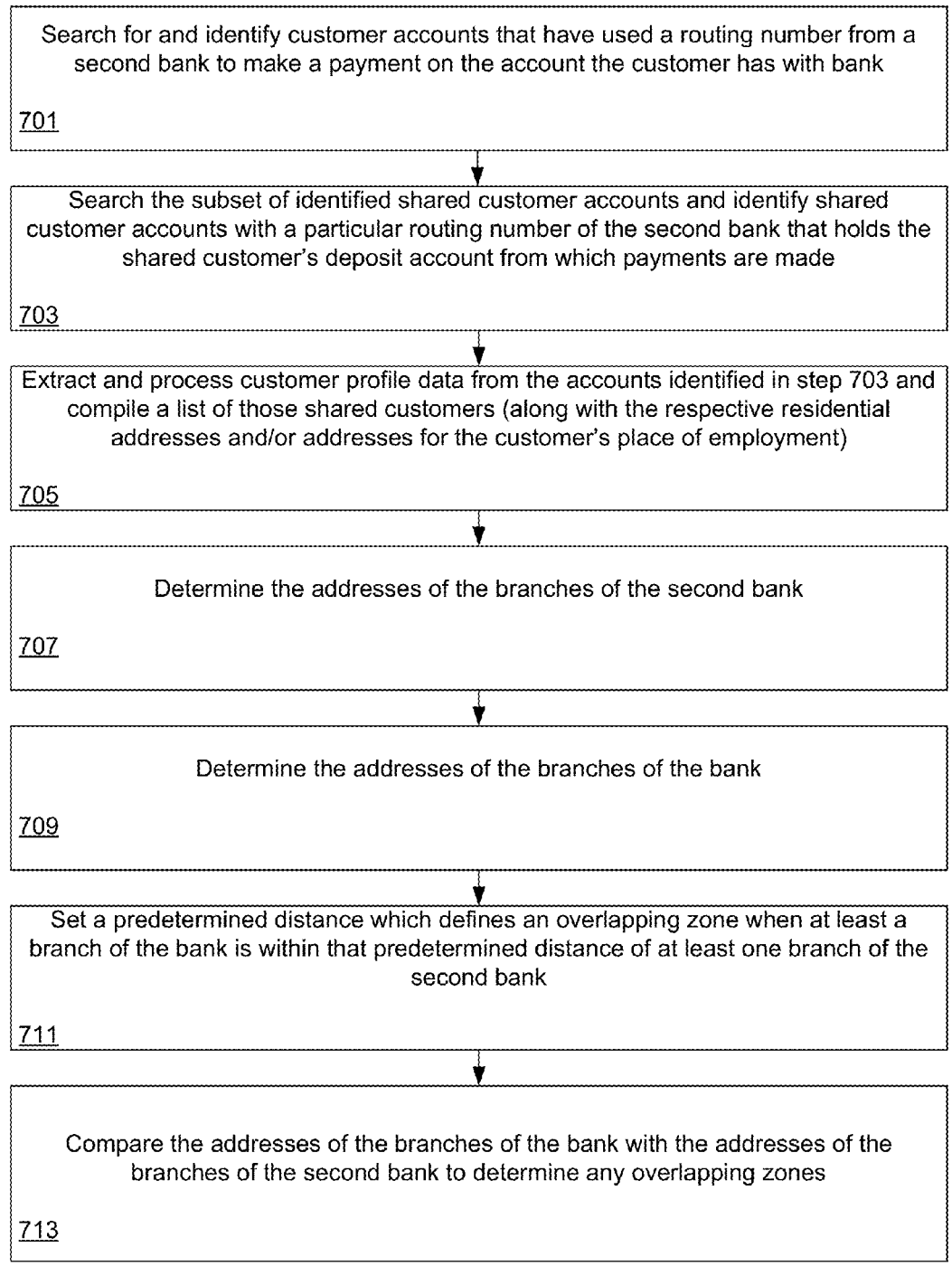
FIGS. 7A and 7B illustrate a flow chart which describes an illustrative process for identifying potential customers according to one aspect of the disclosure.
Figure 7B:
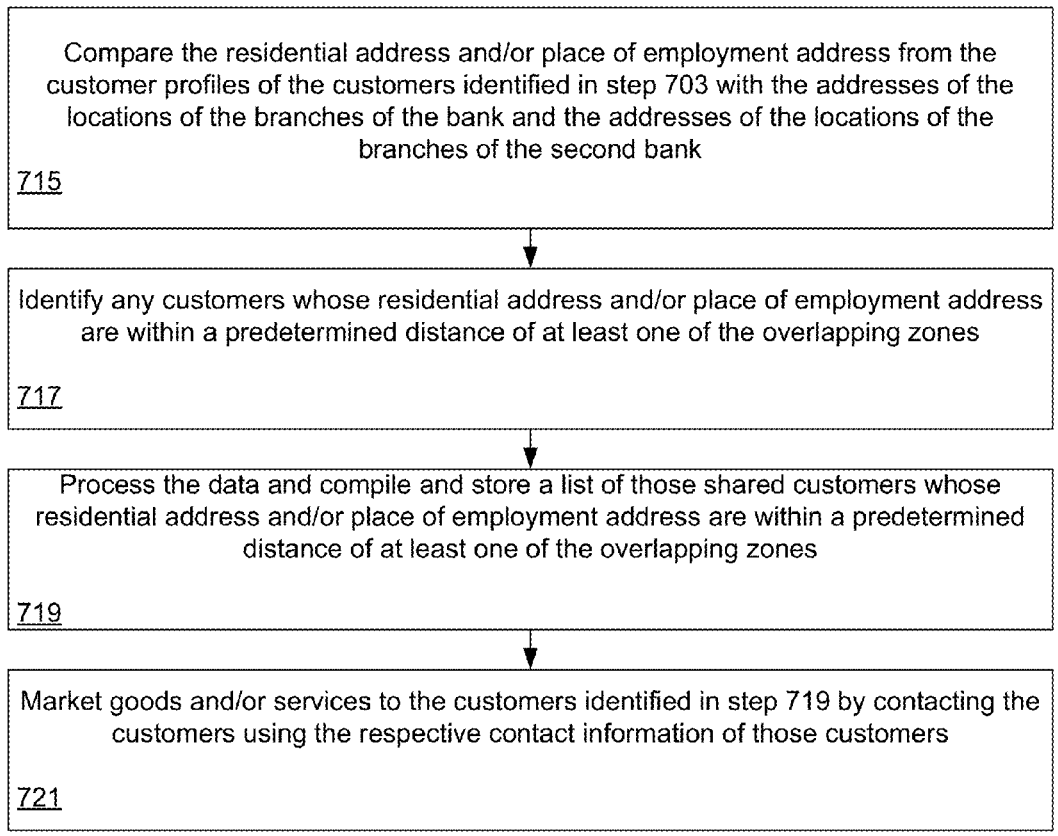

FIGS. 7A and 7B illustrate a flow chart which describes an illustrative process for implementing the above described features for identifying potential customers. As seen in FIGS. 7A and 7B, in step 701 the bank may search for and identify customer accounts that have used a routing number from a second bank to make a payment on the account the customer has with the bank (e.g., the bank may use computers 215 to search customer profiles databases 210). Further, in step 703, once such shared customer accounts have been identified, the bank may (e.g., via one or more computers 215) search the subset of identified shared customer accounts and identify shared customer accounts with a particular routing number of the second bank that holds the shared customer's deposit account from which payments are made. Further, in step 705, the bank may (e.g., via one or more computers 215) extract and process customer profile data from the accounts identified in step 703 and compile a list of those shared customers (along with the respective residential addresses and/or addresses for the customer's place of employment). Further, in step 707, the bank may (e.g., via one or more computers 215) determine the addresses of the branches of the second bank. Further, in step 709, the bank may (e.g., via one or more computers 215) determine the addresses of the branches of the bank. Further, in step 711, the bank may (e.g., via one or more computers 215) set a predetermined distance which defines an overlapping zone when at least a branch of the bank is within that predetermined distance of at least one branch of the second bank. Further, in step 713, the bank may (e.g., via one or more computers 215) compare the addresses of the branches of the bank with the addresses of the branches of the second bank to determine any overlapping zones. Additionally, in step 715, the bank may (e.g., via one or more computers 215) compare the residential addresses and/or place of employment addresses from the customer profiles of the customer accounts identified in step 703 with the addresses of the locations of the branches of the bank and the addresses for the locations of the branches of the second bank to determine if any customer addresses are within a predetermined distance of at least one of the overlapping zones. In step 717, the bank (e.g., via one or more computers 215) may identify customers whose residential address and/or place of employment address are within a predetermined distance of at least one of the overlapping zones. Additionally, in step 719, the bank may (e.g., via one or more computers 215) process the data and compile and store a list of those shared customer whose residential address and/or place of employment address are within a predetermined distance of at least one of the overlapping zones. The respective contact information of the shared customers may be included in the list. Finally, in step 721, the bank may market goods and/or services (e.g., a deposit account with the bank) to the customers associated with the customer accounts identified in step 719 by contacting the customers using the respective contact information of those customers.

Figure 8:
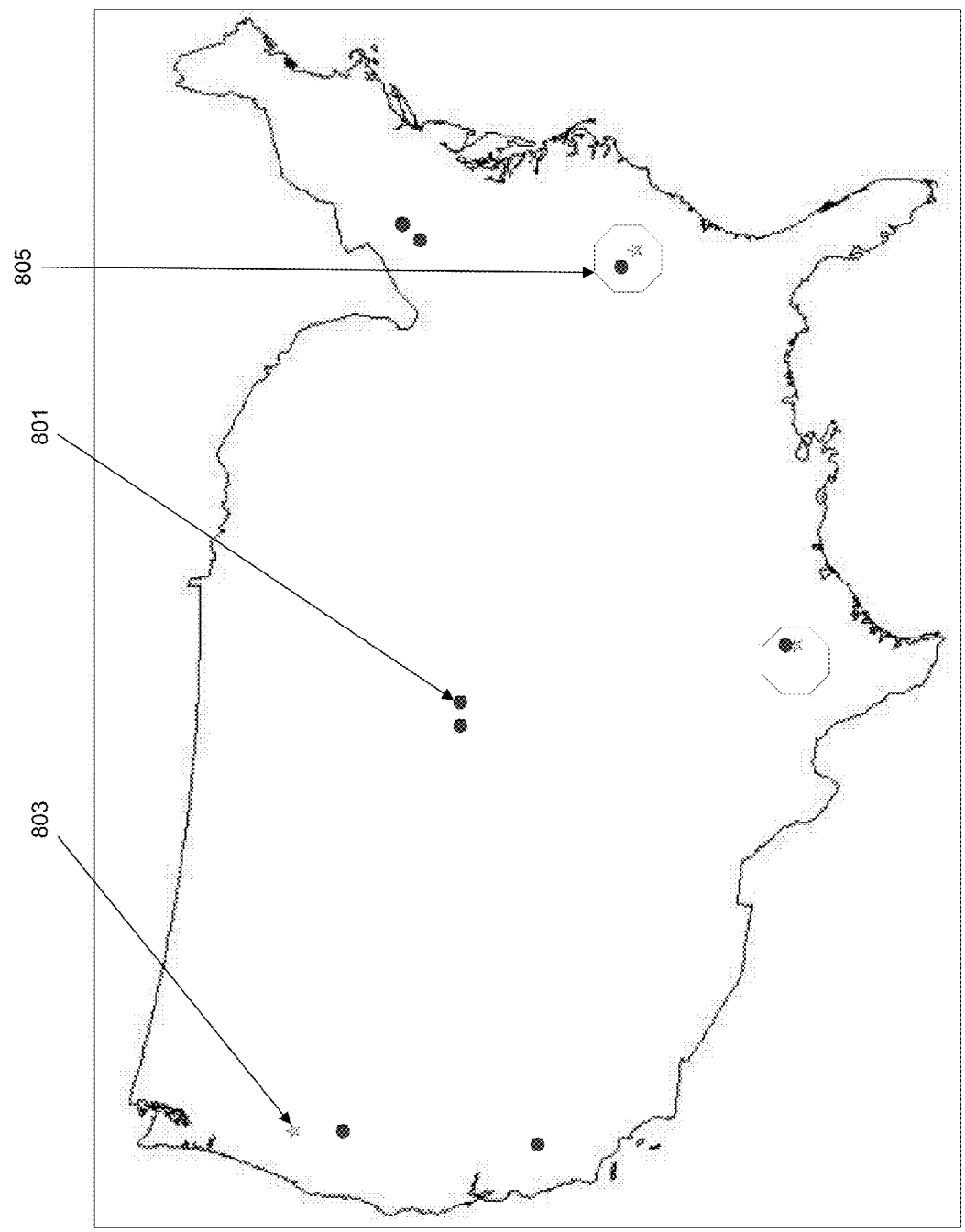
FIG. 8 illustrates a chart which describes a feature included in a process for identifying potential customers according to one aspect of the disclosure.

FIG. 8 is an example of a chart wherein the locations of the branches of the second bank 801, the locations of the branches of the bank 803 and the overlapping zones 805 are shown in relation to each other. Such a chart can be generated by, and used in conjunction with, computer programs comparing the addresses of the branches of the bank and second bank and also when comparing the addresses of the above compiled list of shared customers whose profile data includes a particular routing number of a second bank and whose addresses (either residential, place of employment, or both) are within a predetermined distance of at least one overlapping zone between at least one branch of the bank and at least one branch of the second bank. Such a chart can also be used with manual process and with the other methods of identifying customers described above. Of course, it is noted that the chart shown in FIG. 8 is not to scale and is merely for illustrative purposes. For example, in practice, the chart may include many more branches.

In addition the above described systems and methods for identifying potential customers to which to market goods and/or services, aspects of this disclosure relate to various other systems and methods and for identifying potential customers to which to market goods and/or services. For example, according to aspects of this disclosure, the bank can use additional customer profile information from its pre-existing financial relationships with the shared customers, in order to further identifies potential customers or define or tailor potential marketing efforts. For example, according to aspects of this disclosure, the bank may use individual customer information such as, age, income level, the type of pre-existing financial relationship the shared customer has with the bank, and the like in order to identifying potential customers or define or tailor potential marketing efforts.

For example, according to aspects of this disclosure, potential customers may be identified by determining if the customer is a shared customer and, further, determining the type of pre-existing financial relationship the customer has with the bank. Once it has been determined what type of financial relationship the customer has with the bank, the bank could offer incentives to the shared customers based on the particular type of pre-existing financial relationship the customer has with the bank in order to persuade the customer to open a deposit account with the bank. For example, if the bank determined of the shared customer had a mortgage held by the bank, then the bank could use such information to tailor potential marketing efforts. For example, the bank may offer a reduced interest rate or some other incentive associated with the mortgage. In other words, if the shared customers opened a deposit account with the bank, the bank may reduce the interest rate on the mortgage, by 0.5%, 0.25%, 0.125%, and the like. A similar incentive of a reduced interest rate may also apply if the pre-existing relationship was a credit card, HELOC, car loan, and the like. Hence, in addition to persuading the shared customers to open a deposit account with bank (or purchase some other good or service from the bank) based on geographic location of the branch and/or the pre-existing relationship the customer already has with the bank, the marketing campaign may also increase the likelihood of such a switch by using information from the pre-existing financial relationship and tailoring aspects of the campaign based on that information.

According to aspects of this disclosure, potential customers may be identified by determining if the customer is a shared customer and, further, determining if the shared customer is has a particular income level, income to debt ratio, and the like. For example, once the shared customer's income level has been determined, the bank could tailor the marketing based on the income level of the shared customer. For example, if the bank determined that the shared customer had an income level that was higher than a predetermined income level, then the bank may target the shared customer for marketing a particular good or service. Alternatively, if the bank determined that the shared customer had an income level that was below a predetermined income level, then the bank may not choose to target that shared customer for marketing for marketing a particular good or service. Therefore, it is understood that identifying shared customers who have a particular income level may be useful because potential customers can be screened and, further, the marketing can be tailored so that the targeted customers are more likely to want to purchased the particular goods or services.

According to aspects of this disclosure, potential customers may be identified by determining if the customer is a shared customer and, further, determining the age of the shared customer. For example, once the age of the shared customer income has been determined, the bank could tailor the marketing based on the age of the shared customer. For example, if the bank determined that the age of the shared customer was higher than a predetermined age, then the bank may target the shared customer for marketing a particular good or service (e.g., retirement account or 401k products). Alternatively, if the bank determined that the age of the shared customer was below a predetermined age, then the bank may not choose to target that shared customer for marketing a particular good or service. Therefore, it is understood, that indentifying the age shared customers may be useful because then potential customers can be screened and, further, the marketing can be tailored so that the targeted customers are more likely to want to purchase the particular goods or services. Of course, according to other aspects of this disclosure, other such demographic information may be used as well to indentify potential customers.

In addition the above described systems and methods for identifying potential customers to which to market goods and/or services, aspects of this disclosure relate to various other systems and methods and for identifying potential customers to which to market goods and/or services. For example, according to aspects of this disclosure, the bank may use the amount of funds in deposit accounts of different branches of a second bank in order to identify potential customers. For example, according to aspects of this disclosure, the bank may use such information in order to determine and/or prioritize particular geographic areas in which to market goods and/or services.

According to aspects of this disclosure, the bank may acquire information regarding the amount of funds in deposit accounts throughout the country. Information regarding the amount of funds in deposit accounts throughout the country may be publically available. For example, the Federal Deposit Insurance Corporation (FDIC) publishes information regarding the amount of funds in deposit accounts of every bank and thrift institution throughout the country. It is noted that the FDIC is a governmental entity which insures deposits in banks and thrift institutions. According to aspects of this disclosure, the bank may use such information to identify particular customers to which to market goods and services and, further, to generally determine marketing strategy and perhaps prioritize marketing campaigns.

For example, according to some aspects of this disclosure, the bank may identify the locations of the branches of a second bank throughout the country. Further, the bank may compare the addresses of the branches of the second bank with the addresses of the branches of their bank. Additionally, the bank may determine its branches that are within a predetermined distance of at least one branch of the second bank. For example, the bank may determine all of its branches that are within three miles of at least one branch of the second bank and all of its branches that are not within three miles of at least one branch of the second bank.

According to aspects of this disclosure, based on deposit information (e.g., deposit information acquired from the FDIC), a bank may determine the amount of funds in deposit accounts in each branch of a second bank throughout the country. Therefore, bank may incorporate such information into the above described branch location information. Hence, the bank may determine the amount of funds in deposit accounts of branches of a second bank that are within a predetermined distance (e.g., 3 miles) of a branch of the bank.

Figure 9:
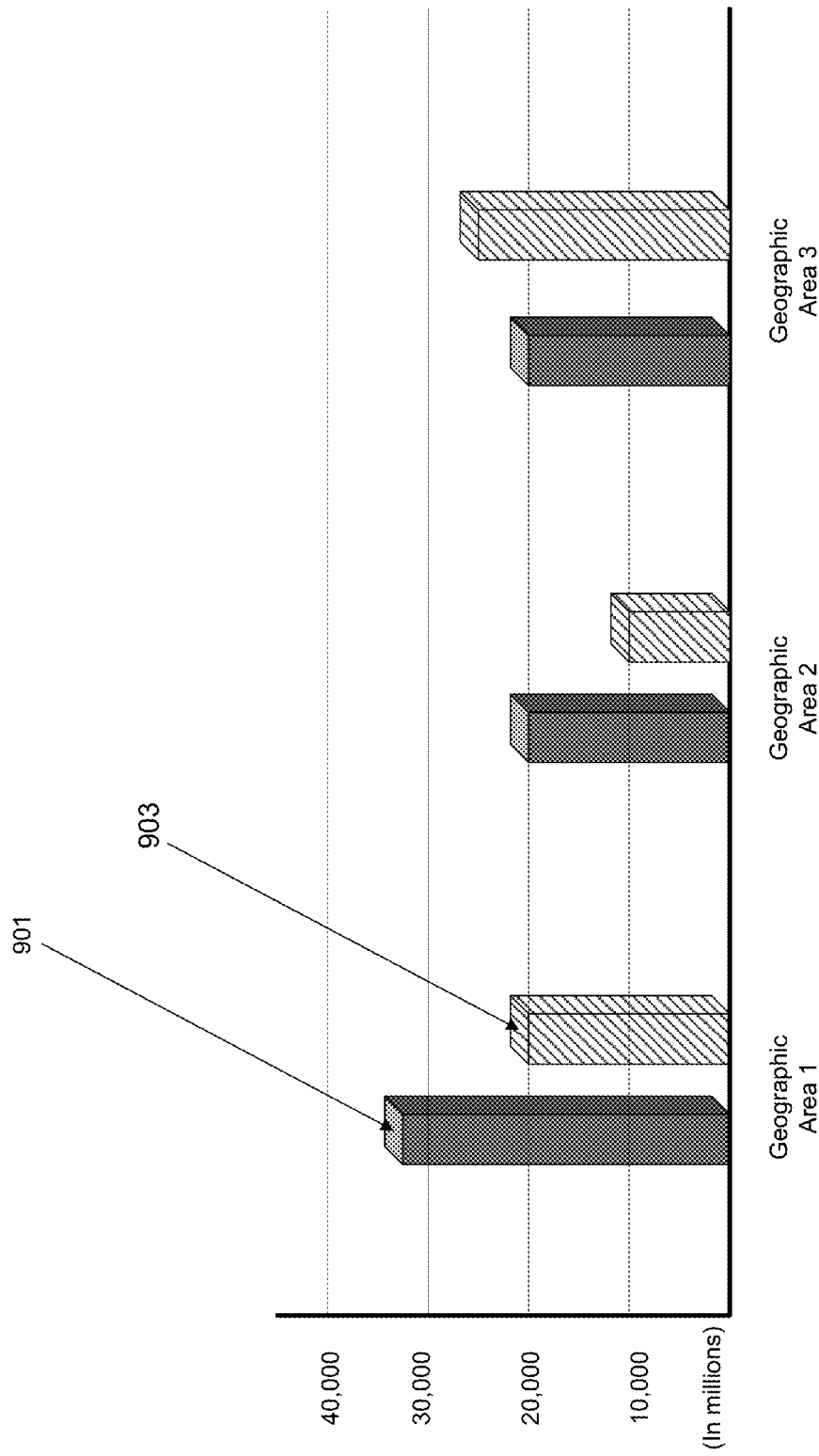
FIG. 9 illustrates a chart which describes a feature included in a process for identifying potential customers according to one aspect of the disclosure.

FIG. 9 shows an example of such information formatted in a chart. FIG. 9 shows the amount of funds in deposit accounts of branches of the second bank in particular geographic areas. The bars 901 indicate the amount of funds in deposit accounts of branches of the second bank that are within a predetermined distance (e.g., 3 miles) of at least one branch of the bank. The bars 903 indicate the amount of funds in deposit accounts of branches of the second bank that are outside of a predetermined distance (e.g., 3 miles) of the branches of the bank. Based on such information, the bank may determine marketing strategy and perhaps prioritize marketing campaigns.

Figure 10:
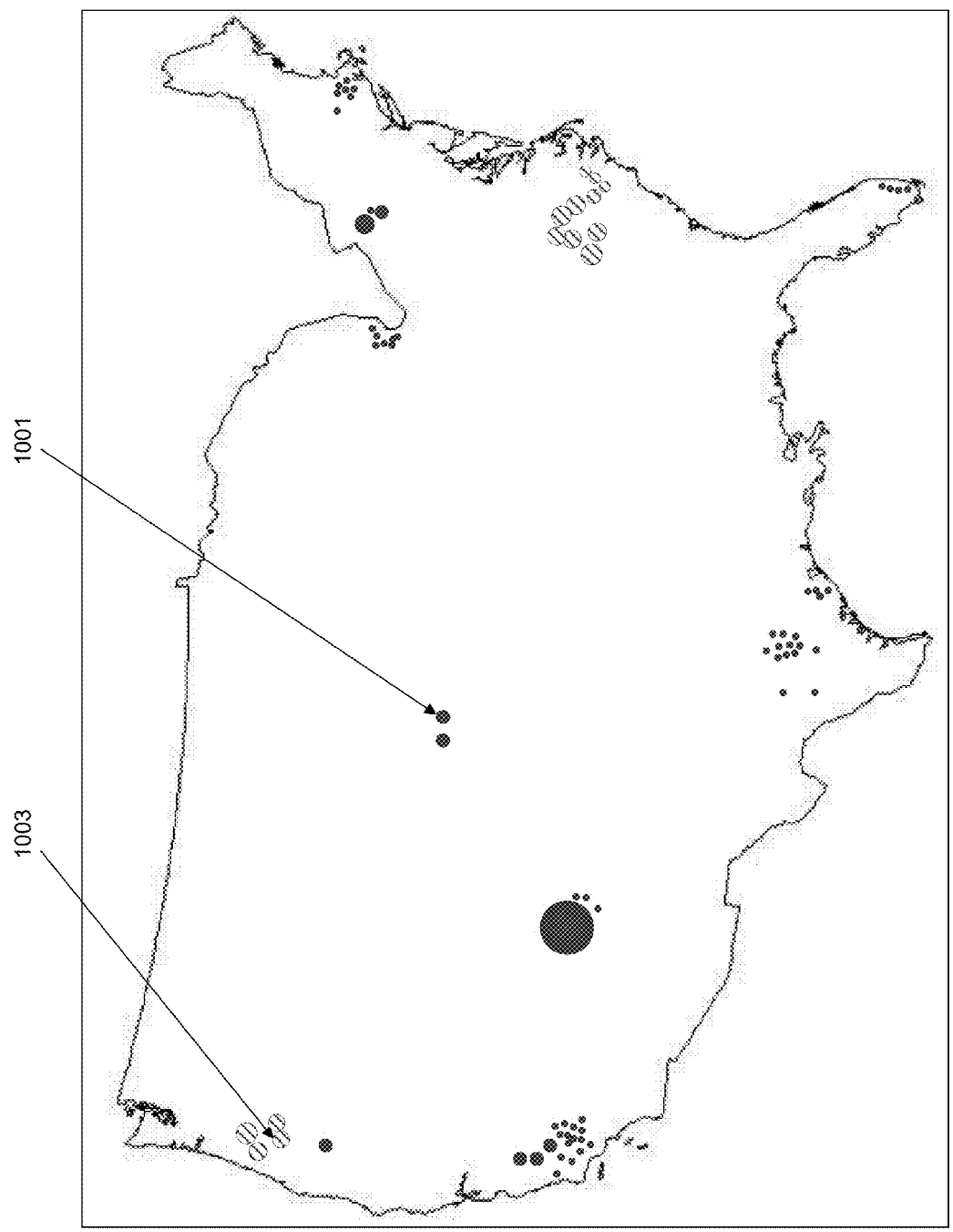
FIG. 10 illustrates a chart which describes a feature included in a process for identifying potential customers according to one aspect of the disclosure.

FIG. 10 shows an example of such information formatted in a chart. FIG. 10 shows the amount of funds in deposit accounts of branches of the second bank in various geographic areas throughout the country. The filled circles 1001 indicate deposit accounts of branches of the second bank that are within a predetermined distance (e.g., 3 miles) of at least one branch of the bank. The cross-hatched circles 1003 indicate deposit accounts of branches of the second bank that are outside of a predetermined distance (e.g., 3 miles) of the branches of the bank. According to aspects of this disclosure, the size of the circles may indicate the amount of funds in deposit accounts of branches of the second bank. Based on such information, the bank may determine marketing strategy and perhaps prioritize marketing campaigns for various geographic regions, such as states, region of the country, and the like.

The above described comparison of the locations of the branches of the bank and branches of the second bank can be done in various ways. For example, one such method may include using a computer program which charts the locations of the branches of the bank and the locations of the branches of the bank (e.g., in a format wherein the locations of the branches of the bank are positioned on a map of a geographic area (e.g., a map of a country)) and then incorporates the different branches of the second bank by overlaying the locations of the branches of the second bank over the locations of the branches of the bank (e.g., using their addresses). The computer program may then automatically determine which locations of the bank have an address within a predetermined distance (specified by the user) of at least one of the addresses of the branches of the second bank. Further, the deposit information may be entered into the computer program and the computer program may automatically correlate the deposition information with the respective locations of the second bank. For example, the commercially available program discussed above is a tool that could be used for such a comparison of the geographic locations of the branches of the two banks and analysis of the deposit information. Additionally, it is noted that the comparison may be done in other ways as well (e.g., manually or via a computer, wherein the addresses are compared via a spreadsheet or another format).

According to aspects of this disclosure, the bank may market goods or services in a certain geographic area if it has a branch within a predetermined distance (e.g., 3 miles, same zip code, and the like) of the a branch of the second bank in that geographic area and, further, the amount of funds in deposit accounts of the branch of the second bank is above a predetermined amount (e.g., $1,000,000.00).

According to other aspects of this disclosure, the bank may market goods or services in geographic areas in which it has a branch within a predetermined distance of a branch of the second bank. Further, in such aspects of the disclosure, the bank may use the amount of funds in deposit accounts of the branches of the second bank in the geographic area to prioritize to which geographic areas it markets its goods or services. For example, when the amount of funds in deposit accounts of the second branch of a first geographic area is much greater than the amount of funds in deposit accounts of the second branch of a second geographic area, then the bank may give the first geographic area priority over the second geographic area with regard to marketing the bank's goods or services (e.g., the bank may allocate more finances to the marketing of the first geographic area in order to market it more heavily or may simply market the first geographic area and refrain from marketing the second geographic area until a later time).

According to aspects of this disclosure, the above described system and method identify potential customers to which the bank can market goods and services based on the geographic location and deposit information. It is noted that the above compiled list is advantageous because it identifies geographic areas for potential marketing and such information may be particularly useful because under particular circumstances such customers are likely to be interested in particular goods or services (e.g., a deposit account) that the bank wishes to market. For example, if any of the above discussed situations occur (i.e., a particular second bank is going out of business, being acquired by another bank, closing branches in a particular region of the country, and the like), then customers of that second bank are more likely to want to switch their banking needs to another financial institution. In other words, if a second bank is consolidating and withdrawing branches from various locations across the country, then a potential market may be created in the void left by the withdrawal. In such a situation, using the deposit information described above, the bank can market efficiently to those areas from which the second bank is withdrawing. For example, if the second bank is withdrawing from several locations, but only a few of those locations have a large amount of funds in the deposit accounts, then the bank may market specifically or more heavily to those locations have a large amount of funds in the deposit accounts as compared with the locations have a smaller amounts of funds in the deposit accounts.

Further, according to one aspect of this disclosure, the marketing may be scheduled to occur shortly after the customers of the second bank are informed of the second bank's withdrawal from the area (e.g., when the second bank closes a branch). For example, at that time, the bank can market to the shared customers it has a branch in the same general location of the branch that the second bank will be closing (i.e. that the customers can still have a local bank if they open a new deposit account with their bank). Therefore, the bank can use the timing of the closing of the second bank's branch to the bank's advantage if it markets to the customers at a time when the bank knows the customers might be searching for a new local or convenient bank. Further, due to the relatively close proximity (i.e., the determined overlap) between the branches of the bank and the second bank, it is less likely that the customer would be reluctant to open a deposit account with the bank based purely on inconvenience of the geographic location of the bank's branch.

Hence, the above described comparison and analysis of the geographic locations of the branches of the bank with the geographic locations of the branches of the second bank and, further, the analysis of deposit information of the branches of the second bank may be advantageous in identifying potential customers to which to market the bank's goods and services, because the bank may consider any customers in the geographic region to be potential customers to whom the bank can market goods and services. Therefore, the bank may market products, to the potential customers in those geographic areas.

Figure 11A:
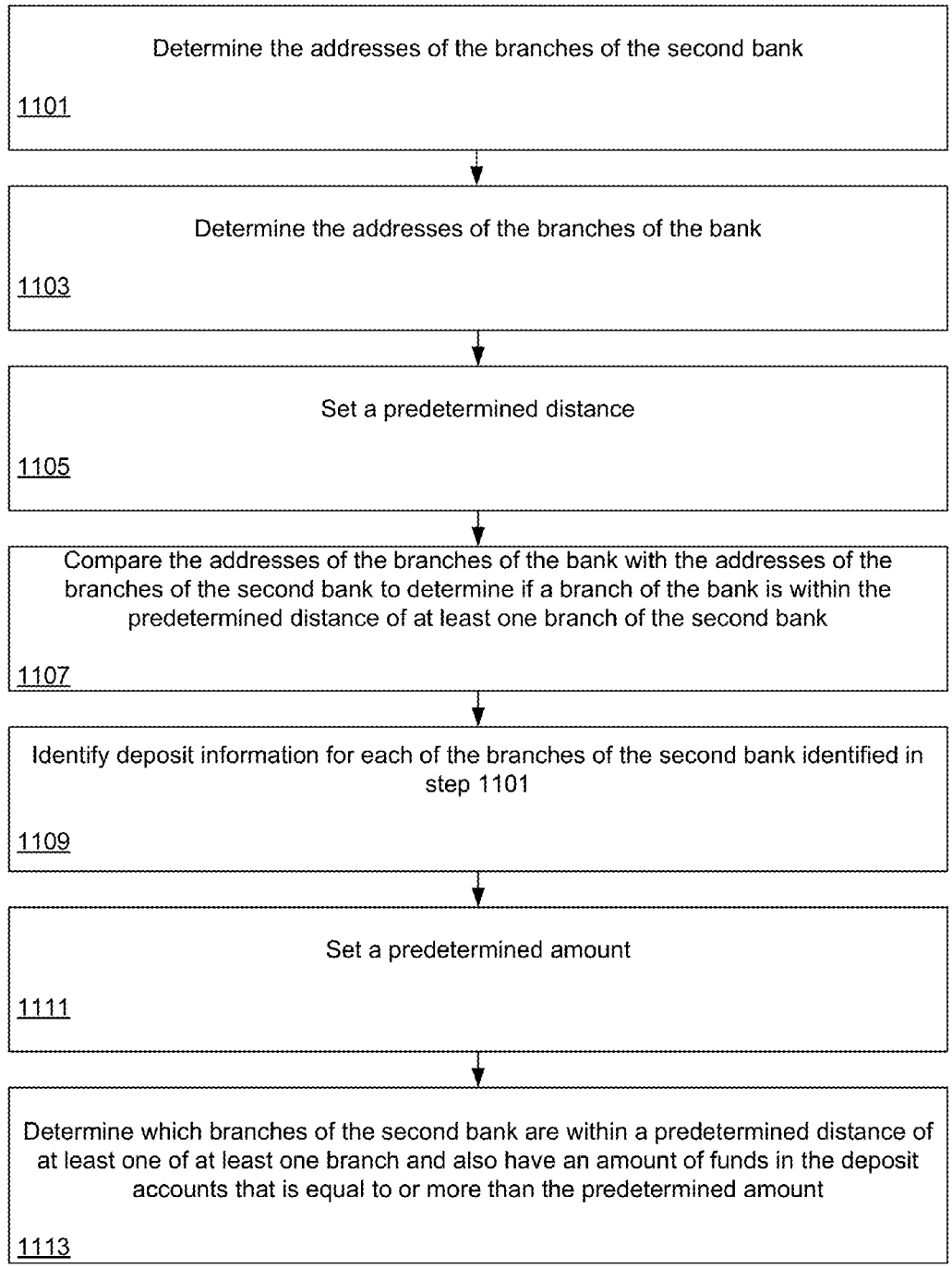
FIGS. 11A and 11B illustrate a flow chart which describes an illustrative process for identifying potential customers according to one aspect of the disclosure.
Figure 11B:
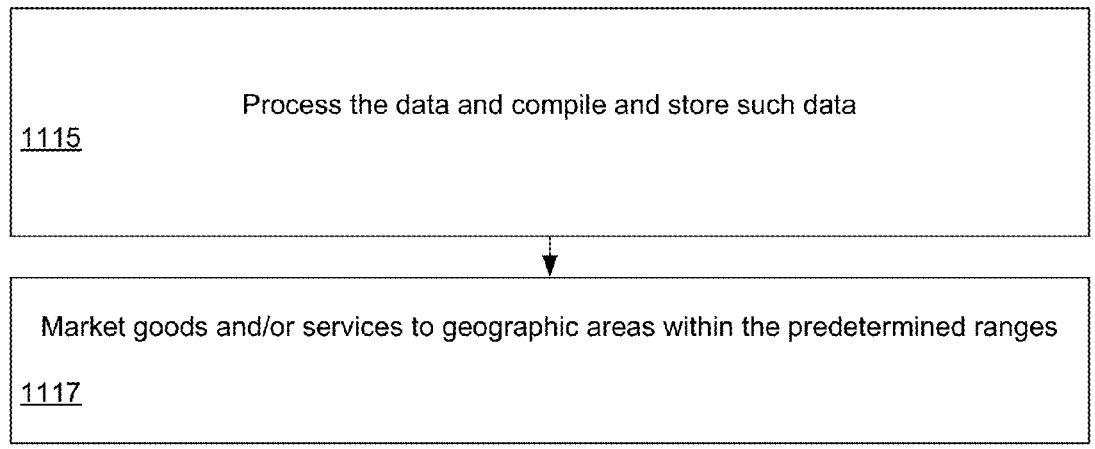

FIGS. 11A and 11B illustrate a flow chart which describes an illustrative process for implementing the above described features for identifying potential customers. As seen in FIG. 11A, in step 1101 the bank may (e.g., via one or more computers 215) determine the addresses of the branches of the second bank. Further, in step 1103, the bank may (e.g., via one or more computers 215) determine the addresses of the branches of the bank. Further, in step 1105, the bank may (e.g., via one or more computers 215) set a predetermined distance. Further, in step 1107, the bank may (e.g., via one or more computers 215) compare the addresses of the branches of the bank with the addresses of the branches of the second bank to determine if a branch of the bank is within the predetermined distance of at least one branch of the second bank. Additionally, in step 1109, the bank may (e.g., via one or more computers 215) identify deposit information for each of the branches of the second bank identified in step 1101. In step 1111, the bank may (e.g., via one or more computers 215) set a predetermined amount. In step 1113, the bank may (e.g., via one or more computers 215) determine which branches of the second bank are within a predetermined distance of at least one of at least one branch and also have an amount of funds in the deposit accounts that is equal to or more than the predetermined amount. Additionally, in step 1115, the bank may (e.g., via one or more computers 215) process the data and compile and store such data. Finally, in step 1117, the bank may market goods and/or services (e.g., a deposit account with the bank) to geographic areas within the predetermined range.

In addition the above described systems and methods for identifying potential customers to which to market goods and/or services, aspects of this disclosure relate to various other systems and methods and for identifying potential customers to which to market goods and/or services. For example, according to aspects of this disclosure, the bank may identify potential customers to which to market goods and/or services by determining customers of the bank who have a deposit account with a second bank, wherein the second bank has a branch within a predetermined distance of a branch of the bank, and also determining the amount of funds in deposit accounts of different branches of a second bank.

Therefore, according to aspects of this disclosure, the bank can determine locations of branches of a second bank that have a relatively large amount of funds in deposit accounts and also, have a high volume of shared customers. This information may be particularly useful because the bank can determine not only branches where the bank has a larger likelihood of converting customers (for the reasons given above such as close proximity, pre-existing relationship with the bank), but, also, areas where such switch over may be most lucrative for the bank.

Therefore, according to some aspects of this disclosure, the bank may identify the locations of the branches of a second bank throughout the country. Further, the bank may compare the addresses of the branches of the second bank with the addresses of the branches of their bank. Additionally, the bank may determine its branches that are within a predetermined distance of at least one branch of the second bank. For example, the bank may determine all of its branches that are within three miles of at least one branch of the second bank.

According to aspects of this disclosure, based on deposit information (e.g., deposit information acquired from the FDIC), a bank may determine the amount of funds in deposit accounts in each branch of a second bank. The bank may incorporate such information into the above described branch location information. Hence, the bank may determine the amount of funds in deposit accounts of branches of a second bank that are within a predetermined distance (e.g., 3 miles) of a branch of the bank. Further, the bank may determine whether the amount of funds in deposit accounts of the branch of the second bank is above a predetermined amount. These comparisons may be done in several ways such as described above (e.g., manually or with a computer program and put in the form of spreadsheet, chart, geographic map, and the like or combinations thereof).

Further, according to aspects of this disclose, the bank may determine whether a customer is associated with one of the branches of second bank identified above as being within a predetermined distance of a branch of the bank and wherein the branch has an amount of funds in its deposit accounts that is above a predetermined amount. In other words, the bank may determine whether a customer is a shared customer and if so, whether the customer is associated with that particular branch of the second bank. Such a determination may be made in the above described manner (e.g., using computers 215 that identify accounts that have used a particular routing number from a second bank to make a payment on the account the customer has with the bank by searching customer profile data in selected databases). Thereby, the computers 215 may identify any shared customer accounts which make payments from deposit accounts at that particular branch of the bank (i.e., any shared customer accounts which contain the particular routing number).

Further, according to aspects of this disclosure, once such comparison has been made to identify shared customers whose routing number in the payment information indicates that the payment was made from a second bank branch that is within a predetermined distance of at least one branch of the bank and has an amount of funds in deposit accounts equal to or more than a predetermined amount, the computers 215 may be configured to process the data and compile a list of the indentified shared customers. The list may include the respective contact information of the shared customers. According to one or more aspects of this disclosure, the list of such shared customers may be stored for further use.

The bank may use the list to market products, such as a deposit account with the bank, to the potential customers identified on the list. Further, the bank may use the shared customer's contact information (e.g., residential address, phone numbers, email address, and the like) to market such products.

Figure 12A:
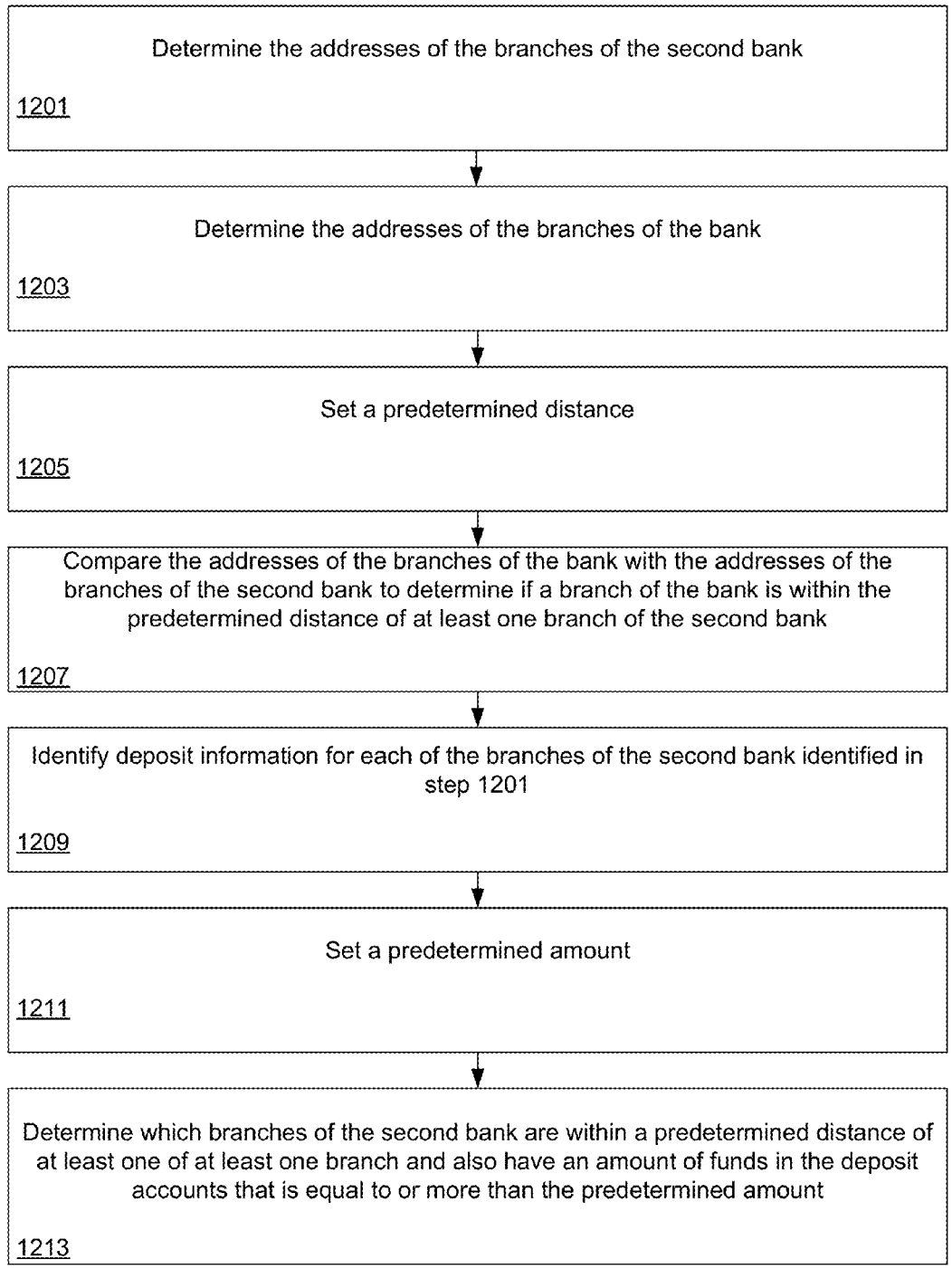
FIGS. 12A and 12B illustrate a flow chart which describes an illustrative process for identifying potential customers according to one aspect of the disclosure.
Figure 12B:
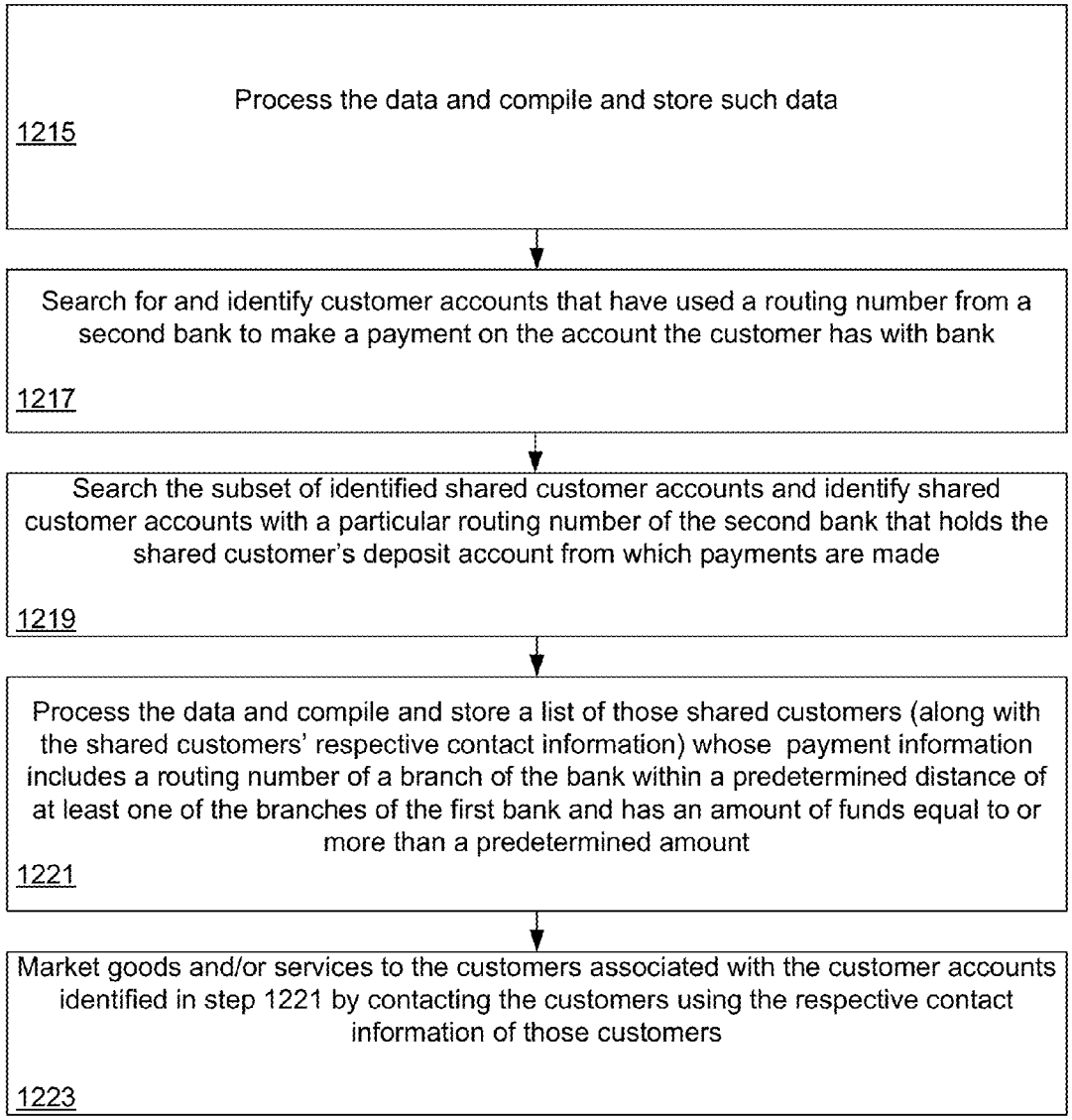

FIGS. 12A and 12B illustrate a flow chart which describes an illustrative process for implementing the above described features for identifying potential customers. As seen in FIG. 12A, in step 1201 the bank may (e.g., via one or more computers 215) determine the addresses of the branches of the second bank. Further, in step 1203, the bank may (e.g., via one or more computers 215) determine the addresses of the branches of the bank. Further, in step 1205, the bank may (e.g., via one or more computers 215) set a predetermined distance. Further, in step 1207, the bank may (e.g., via one or more computers 215) compare the addresses of the branches of the bank with the addresses of the branches of the second bank to determine if a branch of the bank is within the predetermined distance of at least one branch of the second bank. Additionally, in step 1209, the bank may (e.g., via one or more computers 215) identify deposit information for each of the branches of the second bank identified in step 1201. In step 1211, the bank may (e.g., via one or more computers 215) set a predetermined amount. In step 1213, the bank may (e.g., via one or more computers 215) determine which branches of the second bank are within a predetermined distance of at least one of at least one branch and also have an amount of funds in the deposit accounts that is equal to or more than the predetermined amount. Additionally, in step 1215, the bank may (e.g., via one or more computers 215) process the data and compile and store such data. In step 1217 the bank may search for and identify customer accounts that have used a routing number from a second bank to make a payment on the account the customer has with the bank (e.g., the bank may use computers 215 to search customer profiles databases 210). Further, in step 1219, once such shared customer accounts have been identified, the bank may (e.g., via one or more computers 215) search the subset of identified shared customer accounts and identify shared customer accounts with a particular routing number of the second bank that holds the shared customer's deposit account from which payments are made. Further, in step 1221, the bank may (e.g., via one or more computers 215) extract and process customer profile data from the accounts identified in step 1203 and compile a list of those shared customers (along with the respective contact information). Additionally, in step 1221, the bank may (e.g., via one or more computers 215) process the data and compile and store a list of those shared customer whose payment information includes a routing number of a branch of the bank within a predetermined distance of at least one of the branches of the first bank and has an amount of funds equal to or more than a predetermined amount. The respective contact information of the shared customers may be included in the list. Finally, in step 1223, the bank may market goods and/or services (e.g., a deposit account with the bank) to the customers associated with the customer accounts identified in step 1221 by contacting the customers using the respective contact information of those customers.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the aspect of determining deposit amounts within branches of the second bank may be combined with any of the above described aspect of determining shared customers. It will also be appreciated and understood that modifications may be made without departing from the true spirit and scope of the present disclosure. The description is thus to be regarded as illustrative instead of restrictive on the present disclosure.

The invention claimed is:
1. A computer assisted method for identifying potential customers for a first bank comprising:
electronically receiving data relating to addresses of branches of the first bank;

electronically receiving data relating to a second bank, including an address of each branch of the second bank and an amount of funds in deposit accounts in each branch of the second bank;

electronically receiving data relating to customers of the first bank, including, whether a customer has paid a financial account that the customer has with the first bank by using funds from an account associated with a routing number from the second bank;

electronically receiving data relating to customers of the first bank, including the routing number of the second bank the customer used to pay the financial account the customer has with the first bank;

compiling, by a computing device, a list of potential customers to which to market goods and services by making a series of determinations about the electronically received data, wherein the determinations include:

determining if a branch of the second bank has an address within a predetermined distance of an address of a branch of the first bank;

determining if an amount of funds of the deposit accounts in the branch of the second bank are more than a predetermined amount;

determining a bank routing number for the branch of the second bank when the address of the branch of second bank is within the predetermined distance of the address of the branch of the first bank and the amount of funds of the deposit accounts in the branch of the second bank is more than the predetermined amount;

identifying customers who have made a payment to a financial account with the first bank, using funds from an account associated with the bank routing number associated with the branch of the second bank, when:

the address of the branch of the second bank is within the predetermined distance of the address of the branch of the first bank, and of the amount of the deposit accounts in the branch of the second bank is more than the predetermined amount, wherein the determinations are stored in the computer.

2. The computer assisted method of claim 1, further comprising:

electronically receiving data relating to the identified customers, including contact information for the identified customers, wherein the series of determinations further includes determining the contact information for the identified customers.

3. The computer assisted method of claim 2, wherein the method for identifying potential customers further comprises:

compiling a list of the identified customers and their respective contact information.

4. The computer assisted method of claim 1, further comprising:

electronically receiving data relating to the identified customers, including addresses for the identified customers of the first bank;

wherein the determinations further includes:

determining addresses of the identified customers;

defining overlapping zones wherein an address of a branch of the first bank is within a predetermined distance of the address of at least one branch of the second bank;

comparing the addresses associated with the identified customers with the overlapping zones; and determining if the addresses associated with the identified customers are within a second predetermined distance of at least one of the overlapping zones.

5. The computer assisted method of claim 4, wherein the method for identifying potential customers further comprises:

compiling a list of the identified customers whose addresses are within the second predetermined distance of the at least one of the overlapping zones.

6. The computer assisted method of claim 1, further comprising: defining geographic areas and prioritizing the geographic areas in which to market goods or services based on the amount of funds in deposit accounts of the branches of the second bank that are in the geographic areas.

7. The computer assisted method of claim 1, wherein the method for identifying potential customers further comprises:

determining an income level of the identified customers.

8. The computer assisted method of claim 1, wherein the method for identifying potential customers further comprises:

determining types of financial accounts held by the identified customers.

9. A computer configured to identify potential locations for implementing a marketing campaign comprising:

a processor; and memory storing computer executable instructions that, when executed, cause the computer to perform a method for identifying potential locations for implementing a marketing campaign, by:

electronically receiving data regarding a first organization;

electronically receiving data regarding a second organization;

based on the electronically received data:

identifying locations of the first organization;

identifying locations of the second organization;

determining an amount of funds in a set of financial accounts in each location of the second organization;

determining if the amount of funds in each location of the second organization is more than a predetermined amount;

comparing the locations of the first organization with the locations of the second organization;

determining locations of the second organization that are within a predetermined distance of at least one location of the first organization; and identifying locations of the second organization that are within the predetermined distance of at least one location of the first organization and that have more funds than the predetermined amount.

10. The computer according to claim 9, wherein the first organization and the second organization are banks and the financial accounts are deposit accounts of a bank.

11. The computer according to claim 10, wherein the method for identifying potential locations for implementing a marketing campaign includes defining geographic areas and prioritizing geographic areas in which to market goods or services based on the amount of funds in deposit accounts of the branches of the second bank that are in the geographic areas.

* * * * *